(12) United States Patent
Kwak et al.

(10) Patent No.: US 7,884,366 B2
(45) Date of Patent: Feb. 8, 2011

(54) THIN FILM TRANSISTOR ARRAY PANEL AND METHOD FOR MANUFACTURING THE SAME

(75) Inventors: Sang-Ki Kwak, Cheonan-si (KR);
Hyang-Shik Kong, Seongnam-si (KR);
Byung-Duk Yang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 275 days.

(21) Appl. No.: 12/220,481

(22) Filed: Jul. 23, 2008

(65) Prior Publication Data

US 2009/0146152 A1  Jun. 11, 2009

(30) Foreign Application Priority Data

Dec. 7, 2007  (KR) ...................... 10-2007-0127011

(51) Int. Cl.
*H01L 29/10* (2006.01)
*H01L 21/00* (2006.01)
*G02F 1/1343* (2006.01)

(52) U.S. Cl. .................. 257/59; 257/72; 257/E27.131; 438/29; 349/144

(58) Field of Classification Search .................. 257/59, 257/72, E27.016, E27.131; 438/29; 349/144
See application file for complete search history.

(56) References Cited

U.S. PATENT DOCUMENTS

2007/0013839 A1* 1/2007 Rho ........................... 349/114

FOREIGN PATENT DOCUMENTS

| JP | 3-267271 | 11/1991 |
| JP | 9-258199 | 10/1997 |
| JP | 9-292633 | 11/1997 |
| JP | 11-190859 | 7/1999 |
| JP | 2000-122072 | 4/2000 |
| JP | 2001-142064 | 5/2001 |
| JP | 2002-131735 | 5/2002 |
| JP | 2007-25674 | 2/2007 |

(Continued)

OTHER PUBLICATIONS

Patent Abstracts, Publication No. 03-267271, Nov. 28, 1991, 1 p.

(Continued)

*Primary Examiner*—Lex Malsawma
(74) *Attorney, Agent, or Firm*—Innovation Counsel LLP

(57) ABSTRACT

A thin film transistor array panel and a method of its manufacture are presented. The thin film transistor array panel according to an embodiment includes a substrate, a gate line extending in a first direction on the substrate, a data line extending in a second direction on the substrate and intersecting and insulated from the gate line, a thin film transistor including a control terminal connected to the gate line, an input terminal connected to the data line and an output terminal, a color filter formed on the thin film transistor, a light blocking member formed on the thin film transistor, defining the space for storing the color filter, and including a first protection portion surrounding at least the region of the output terminal of the thin film transistor, and a pixel electrode formed on the light blocking member and the color filter and contacting the region of the output terminal surrounded by the first protection portion of the light blocking member.

20 Claims, 24 Drawing Sheets

FOREIGN PATENT DOCUMENTS

| KR | 10-2005-0066665 | 6/2005 |
|---|---|---|
| KR | 10-2006-0115778 | 11/2006 |

OTHER PUBLICATIONS

Patent Abstracts, Publication No. 09-258199, Oct. 3, 1997, 1 p.
Patent Abstracts, Publication No. 09-292633, Nov. 11, 1997, 1 p.
Patent Abstracts, Publication No. 11-190859, Jul. 13, 1999, 1 p.
Patent Abstracts, Publication No. 2000-122072, Apr. 28, 2000, 1 p.
Patent Abstracts, Publication No. 2001-142064, May 25, 2001, 1 p.
Patent Abstracts, Publication No. 2002-131735, May 9, 2002, 1 p.
Patent Abstracts, Publication No. 2007-025674, Feb. 1, 2007, 1 p.
Korean Patent Abstracts, Publication No. 1020050066665, Jun. 30, 2005, 2 pp.
Korean Patent Abstracts, Publication No. 1020060115778, Nov. 10, 2006, 1 p.

* cited by examiner

THIN FILM TRANSISTOR ARRAY PANEL AND METHOD FOR MANUFACTURING THE SAME

CROSS-REFERENCE TO RELATED APPLICATION

This application claims priority to and the benefit of Korean Patent Application No. 10-2007-0127011 filed in the Korean Intellectual Property Office on Dec. 7, 2007, the entire content of which is incorporated herein by reference.

BACKGROUND (a) Technical Field

The present invention relates a thin film transistor array panel and a manufacturing method thereof.

(b) Description of the Related Art

Liquid crystal displays (LCDs) are one of the most widely used flat panel displays. An LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field in the LC layer that determines the orientations of LC molecules therein to adjust polarization of incident light.

This liquid crystal display also includes a color filter for displaying colors by using light transmitted through the liquid crystal layer, and the color filter is generally disposed on a display panel having a common electrode. Since the color filter commonly includes red, green, and blue colors, the color filters are aligned to face the corresponding pixels when the two display panels are combined. However, because the area of the light blocking member defining the openings corresponding to the pixels is sufficiently wide considering a misalignment margin, the size of the openings is decreased such that the aperture ratio of the pixels may be reduced.

To solve the problem, techniques in which the color filters are formed on the display panel having thin film transistors or the color filters are formed through an Inkjet method have been provided. Forming the color filters using an inkjet deposition method is advantageous because photolithographic light exposure is not used, and it simplifies the manufacturing process.

However, because the color filters cover the drain electrodes of the thin film transistors in this conventional art, contact holes for the connection between the pixel electrodes and the drain electrodes are formed through an overcoat layer covering color filters, the color filters, and a passivation layer. Accordingly, there are manufacturing process complications, the etching uniformity of the color filters is deteriorated, and loose particles that are generated when etching the color filters contaminate the processing chamber.

The above information disclosed in this Background section is only for enhancement of understanding of the background of the invention and therefore it may contain information that does not form the prior art that is already known in this country to a person of ordinary skill in the art.

SUMMARY

Embodiments of the present invention are disclosed to simplify a method of manufacturing a liquid crystal display, including to easily form color filters.

In an exemplary embodiment of the present invention, a light blocking member encloses contact holes.

In one aspect, the invention is a thin film transistor array panel that includes a substrate; a gate line extending in a first direction on the substrate; a data line, insulated from the gate line, extending in a second intersecting direction on the substrate; a thin film transistor including a control terminal connected to the gate line; an input terminal connected to the data line and an output terminal; a color filter formed on the thin film transistor; a light blocking member formed on the thin film transistor, defining the space for storing the color filter, and including a first protection portion surrounding at least the region of the output terminal of the thin film transistor; and a pixel electrode formed on the light blocking member and the color filter, and contacting the region of the output terminal surrounded by the first protection portion of the light blocking member.

The height of the light blocking member may be in the range of 1.5 μm-4 μm, the light blocking member may include a second protection portion extending according to the data line, and the color filter has different colors in two regions divided by a signal line portion.

The thin film transistor array panel may include a storage electrode line extending in the first direction and including a storage electrode, wherein the light blocking member may include a third protection portion surrounding at least the portion of the storage electrode along with the second protection portion to prevent the color filter from being formed on the storage electrode.

The light blocking member may include a fourth protection portion covering the thin film transistor.

At least a portion of the output terminal of the thin film transistor may overlap the storage electrode, and the first protection portion of the light blocking member may enclose the portion of the output terminal overlapping the storage electrode.

The thin film transistor may include a first thin film transistor and a second thin film transistor; the pixel electrode may include a first sub-pixel electrode connected to the output terminal of the first thin film transistor and a second sub-pixel electrode connected to the output terminal of the second thin film transistor; and the first protection portion of the light blocking member may include first and second portions disposed on both sides with respect to the storage electrode, and a third portion connecting the first portion and the second portion to each other and overlapping a gap between the first sub-pixel electrode and the second sub-pixel electrode.

The thin film transistor array panel may further include a passivation layer formed over the thin film transistor and under the light blocking member and the color filter, and an overcoat layer formed over the light blocking member and the color filter and under the pixel electrode, wherein the pixel electrode may be connected to the output terminal of the thin film transistor through a contact hole formed in the passivation layer and the overcoat layer.

The data line may include a first data line and a second data line, the thin film transistor may include a first thin film transistor having an input terminal connected to the first data line and a second thin film transistor having an input terminal connected to the second data line, and the pixel electrode may include a first sub-pixel electrode connected to an output terminal of the first thin film transistor and a second sub-pixel electrode connected to an output terminal of the second thin film transistor.

The thin film transistor array panel may further include a storage electrode line extending in the first direction and including a storage electrode, wherein the first protection portion of the light blocking member may include a first portion surrounding the output terminal of the first thin film transistor and a second portion surrounding the output terminal of the second thin film transistor, and the first and second portions of the light blocking member may overlap the storage electrode.

The thin film transistor array panel may further include a storage electrode line extending in the first direction and including a storage electrode, wherein the first protection portion of the light blocking member may include a first portion surrounding the output terminal of the first thin film transistor and a second portion surrounding the output terminal of the second thin film transistor, and the first and second portions of the light blocking member may overlap the storage electrode.

In another aspect, the invention is a method for manufacturing a thin film transistor array panel includes forming a gate line extending in a first direction; forming a gate insulating layer on the gate line; forming a semiconductor layer on the gate insulating layer; forming a data line and a drain electrode extending in a second direction intersecting the first direction; forming a passivation layer on the data line and the drain electrode; forming a light blocking member including a first portion defining a storing space and extending in the second direction on the passivation layer and a second portion surrounding the circumference of the end portion of the drain electrode; forming a color filter in the storing space through an inkjet process; forming a contact hole exposing the end portion of the drain electrode enclosed by the second portion; and forming a pixel electrode connected to the drain electrode through the contact hole.

The method may further include forming an overcoat layer covering the color filter between the forming of the color filter and the forming of the contact hole, wherein the overcoat layer and the passivation layer may be patterned together by photolithography in the forming of the contact hole.

The light blocking member may include forming a photosensitive film by coating a photosensitive material including black color pigments, exposing the photosensitive film, and developing the photosensitive film.

According to an embodiment of the present invention, the light blocking member is formed according to the data line to define a storing space with a stripe shape such that the color filter may be easily formed by using an Inkjet process.

Also, the contact hole may be surrounded by the light blocking member in the present invention such that it may prevent the color filter from covering the contact hole even though the color filter is formed through the Inkjet process.

Also, the storing space where the color filter is formed may be disposed with a striped arrangement in the present invention such that ink dripping for the color filter may be sequentially executed.

DETAILED DESCRIPTION OF THE EMBODIMENTS

Figure 1:
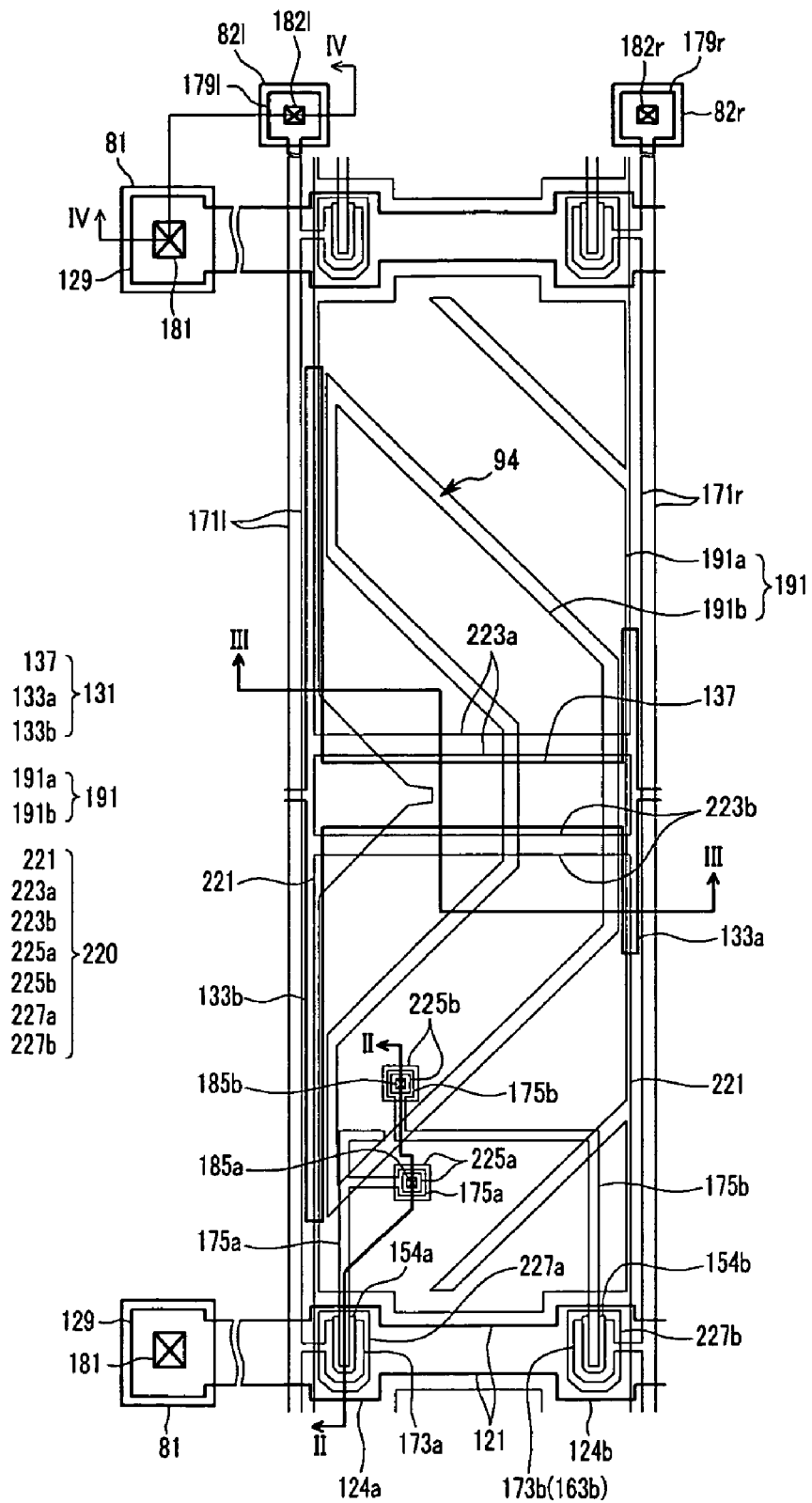
FIG. 1 is a layout view of a thin film transistor array panel according to a first exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Exemplary Embodiment 1

Figure 2:
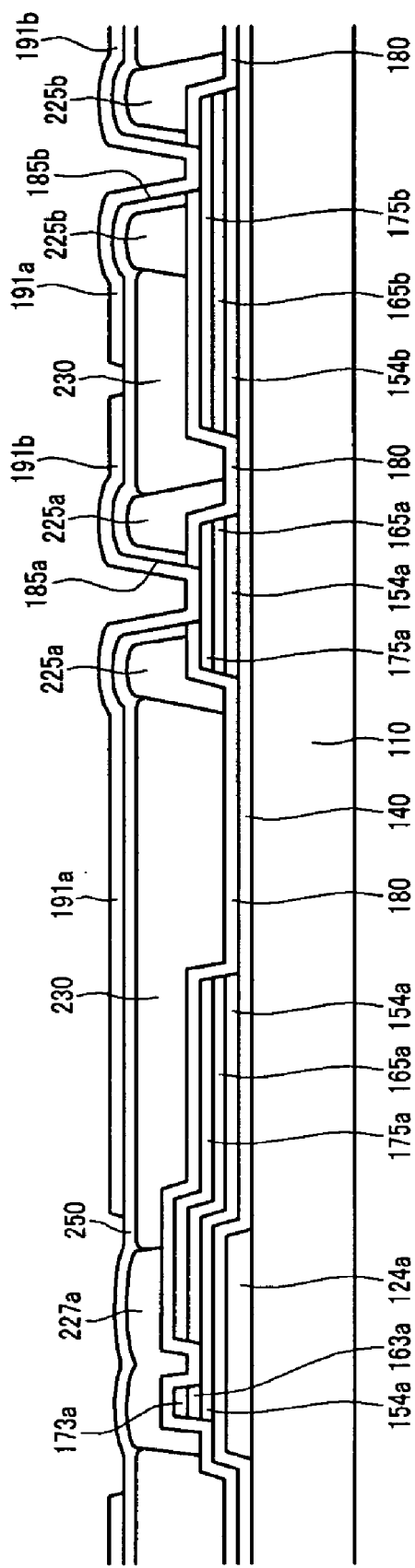
FIG. 2 is a cross-sectional view taken along the line II-II of FIG. 1.
Figure 3:
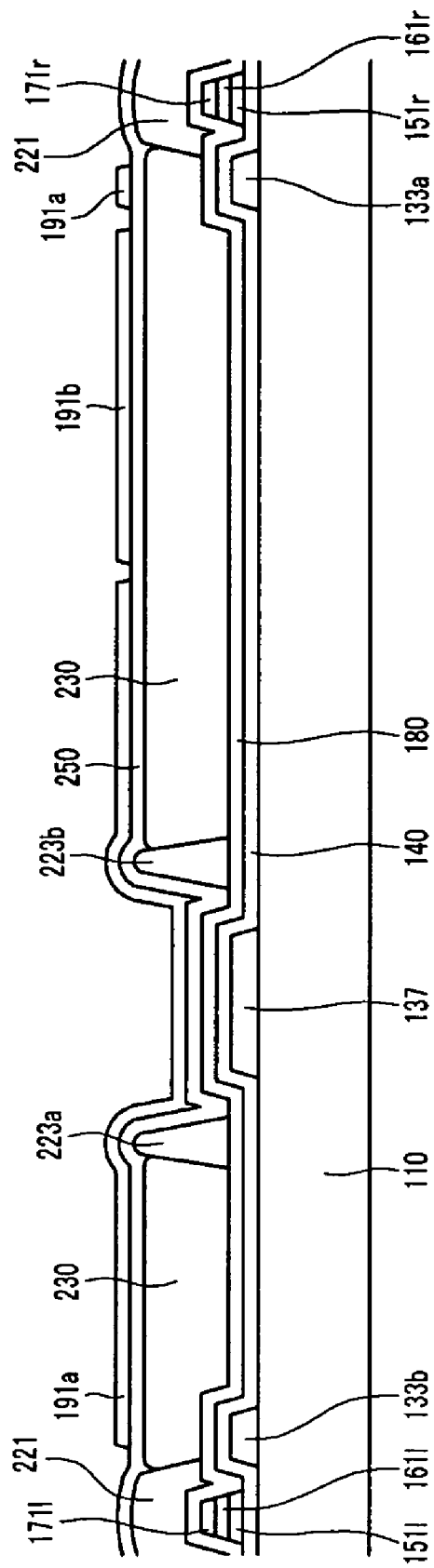
FIG. 3 is a cross-sectional view taken along the line III-III of FIG. 1.
Figure 4:
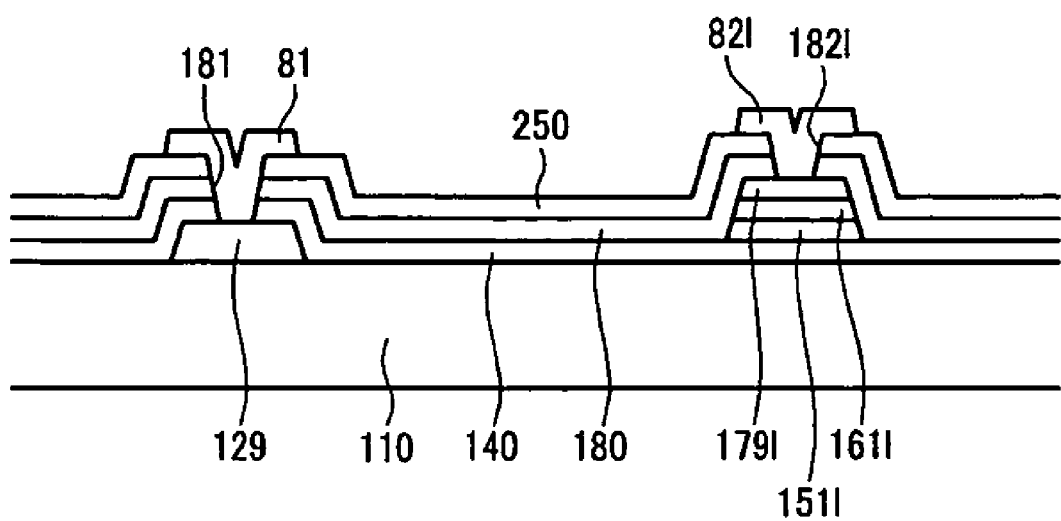
FIG. 4 is a cross-sectional view taken along the line IV-IV of FIG. 2.

Now, a thin film transistor array panel according to an exemplary embodiment of the present invention will be described in detail. FIG. 1 is a layout view of a thin film transistor array panel according to a first exemplary embodiment of the present invention, and FIG. 2 to FIG. 4 are cross-sectional views taken along the lines II-II, III-III, and IV-IV of FIG. 1, respectively.

In a thin film transistor array panel according to an exemplary embodiment of the present invention, a plurality of gate lines 121 and a plurality of storage electrode lines 131 are formed on an insulation substrate 110 that is preferably made of transparent glass.

The gate lines 121 transmit gate signals and extend substantially in a transverse direction. Each gate line 121 includes a plurality of protrusions including gate electrodes 124a and 124b, and an end portion 129 having a large area for connection with another layer or an external driving circuit. The storage electrode lines 131 are disposed between the two adjacent gate lines 121 and extend substantially parallel to the gate lines 121 in the transverse direction. A predetermined voltage, such as a common voltage Vcom applied to a common electrode, is applied to the storage electrode line 131. The storage electrode line 131 includes a plurality of protrusions forming a plurality of storage electrodes 137, and a plurality of branches 133a and 133b for preventing light leakage and increasing the area of the storage electrodes.

The gate lines 121 and the storage electrode lines 131 may have a multi-layered structure including two conductive layers (not shown) having different physical properties. One of the two conductive layers is preferably made of a low resistivity metal, such as an Al-containing metal, a Ag-containing metal, or a Cu-containing metal, for reducing signal delay or voltage drop in the gate lines 121 and the storage electrode lines 131. The other conductive layer is preferably made of a material such as a Mo-containing metal, Cr, Ti, and Ta, which has good contact characteristics with other materials such as indium tin oxide (ITO) and indium zinc oxide (IZO). As examples of these combinations, a chromium lower layer and an aluminum (alloy) upper layer, and an aluminum (alloy) lower layer and a molybdenum (alloy) upper layer may be formed. However, the gate lines 121 and the storage electrode lines 131 may be made of various other metals or electrical conductors.

Side surfaces of the gate lines 121 and the storage electrode lines 131 are inclined to a surface of the substrate 110, and an inclination angle thereof is preferably about 30° to 80°.

A gate insulating layer 140, which is made of silicon nitride (SiNx), silicon oxide (SiOx), or so on, is formed on the gate lines 121 and the storage electrode lines 131.

A plurality of semiconductor stripes 151l and 151r that are made of hydrogenated amorphous silicon (a-Si), polysilicon, or the like, are formed on the gate insulating layer 140. The semiconductor stripes 151l and 151r that are respectively disposed on right and left sides form a pair. The semiconductor stripes 151l and 151r substantially extend in a vertical direction, and include a plurality of protrusions 154a and 154b respectively extending toward the gate electrodes 124a and 124b.

A plurality of ohmic contact stripes 161l and 161r and islands 165a and 165b (ohmic contacts) are formed on the semiconductor stripes 151l and 151r. The ohmic contact stripes 161l and 161r and islands 165a and 165b may be made of a material such as n+ hydrogenated amorphous silicon in which an n-type impurity such as phosphorus is doped with high concentration, or of silicide. The ohmic contact stripes 161l and 161r respectively include a plurality of protrusions 163a and 163b, and the protrusions 163a and 163b and the ohmic contact islands 165a and 165b are formed in pairs and are disposed on the protrusions 154a and 154b of the semiconductor stripes 151l and 151r, respectively.

The semiconductors 151l and 151r and the ohmic contacts 161l, 161r, 165a, and 165b are also inclined with respect to a surface of the substrate 110, and an inclination angle thereof is about 30° to 80°.

A plurality of left and right data lines 171l and 171r and a plurality of first and second drain electrodes 175a and 175b are formed on the ohmic contacts 161l, 161r, 165a, and 165b. Here, the ohmic contact stripes 161l and 161r, and the semiconductor stripes 151l and 151r, are disposed under the left data lines 171l and the right data lines 171r, respectively.

The data lines 171l and 171r transmit data voltages, and extend substantially in a vertical direction while intersecting the gate lines 121 and the storage electrode lines 131. Each of the data lines 171l and 171r includes a plurality of source electrodes 173a and 173b curved toward the gate electrodes 124a and 124b and having "U" shape, and end portions 179l and 179r for connecting to other layers or an external driving circuit.

The drain electrodes 175a and 175b are respectively separated from the data lines 171l and 171r, and face the source electrode 173a and 173b with respect to the gate electrodes 124a and 124b. Each of the drain electrodes 175a and 175b includes one end portion connected to respective sub-pixel electrodes 191a and 191b and having a wide area, and the other end portion having a bar shape. The portions of the drain electrodes 175a and 175b with the bar shape are enclosed by the source electrodes 173a and 173b with the "U" shape, respectively.

The gate electrodes 124a and 124b, the source electrodes 173a and 173b, and the drain electrodes 175a and 175b respectively form thin film transistors Qa and Qb along with the semiconductors 154a and 154b, and the channels of the thin film transistors are formed on the semiconductors 154a and 154b between the source electrodes 173a and 173b, and the drain electrodes 175a and 175b.

The data lines 171l and 171r, and the drain electrodes 175a and 175b, may have a multi-layered structure including a refractory metal layer (not shown) and a low resistance conductive layer (not shown). A multi-layered structure includes, for example, a dual-layer of a chromium or molybdenum (alloy) lower layer and an aluminum (alloy) upper layer, and a triple-layer of a molybdenum (alloy) lower layer, an aluminum (alloy) middle layer, and a molybdenum (alloy) upper layer. However, the data lines 171l and 171r, and the drain electrodes 175a and 175b, may be made of various other metals or conductors.

It is preferable that side surfaces of the data lines 171l and 171r and the drain electrodes 175a and 175b are also inclined relative to the surface of the substrate 110, and an inclination angle thereof is about 30° to 80°, like the gate lines 121 and the storage electrode lines 131.

A passivation layer 180 is formed on the data lines 171l and 171r and the drain electrodes 175a and 175b. The passivation layer 180 is preferably made of silicon nitride or silicon oxide.

Figure 18:
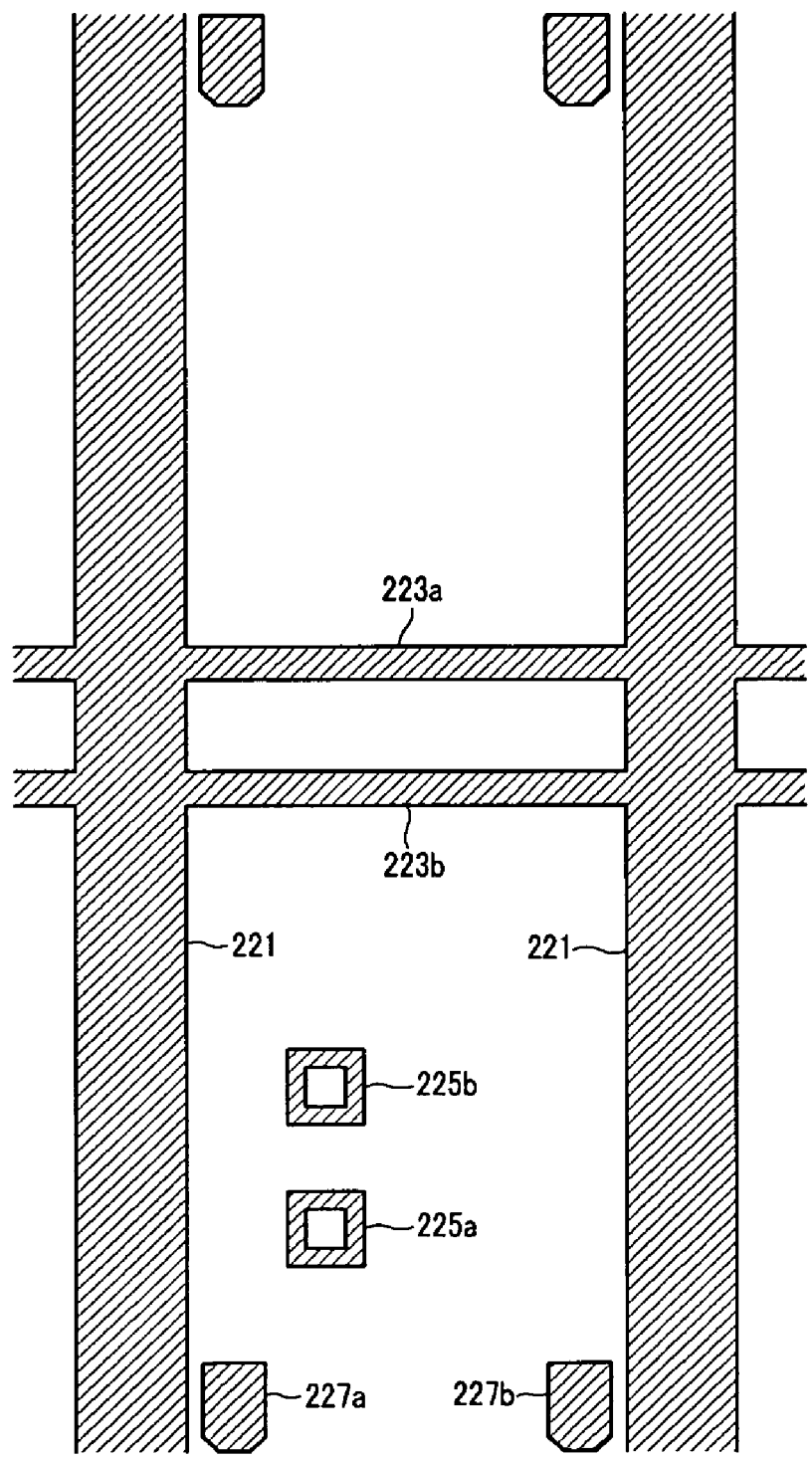
FIG. 18 is a layout view only showing an organic light blocking member in the thin film transistor array panel shown in FIG. 1.

A light blocking member 220 is formed on the passivation layer 180. Referring to FIG. 18, the light blocking member 220 includes first portions 221 extending on the data lines 171l and 171r in the vertical direction, second portions 223a and 223b respectively disposed above and below the storage electrode lines 131, third portions 225a and 225b respectively disposed on the circumference with the drain electrodes 175a and 175b, and fourth portions 227a and 227b respectively covering the channels of the thin film transistors Qa and Qb.

The first portions 221 cover the data lines 171l and 171r, and extend according to the data lines 171l and 171r in the vertical direction for forming a dam. Specifically, the first portions 221 are disposed with the stripe shape to define the space for storing the color filters 230 in the vertical direction, resultantly forming the storing space in the vertical direction. The second portions 223a and 223b are disposed above and below the storage electrode 137 and are formed parallel to the storage electrodes 137 in the horizontal direction such that they are connected between the first portions 221. The third portions 225a and 225b are disposed on the end portions of the drain electrodes 175a and 175b, and have a fence shape enclosing the end portions of the drain electrodes 175a and 175b, when shown on a plane surface. The shapes of the third portions 225a and 225b may be various, such as a quadrangle as shown in FIG. 1, an octagonal shape, or a circular shape.

In this way, because the first portion 221 extends in the vertical direction and forms the dam, the liquid material (hereafter "ink") for forming color filters may be dripped in the storing space through an Inkjet to form the color filters 230. Here, the second portions 223a and 223b are formed adjacent to the storage electrodes 137 such that they may prevent the color filter 230 from being formed over the storage electrode 137. Also, because the third portions 225a and 225b are formed on the portion where contact holes 185a and 185b for connecting the drain electrodes 175a and 175b to pixel electrodes are disposed, they prevent the liquid material from flowing in the portion where the contact holes 185a and 185b will be formed in the Inkjet process such that they prevent the color filter 230 from covering the portion corresponding to the contact holes 185a and 185b.

The color filters 230 may each be colored red, green, or blue. If a red color filter is formed in a first storing space, a green color filter or a blue color filter may be formed in a second storing space neighboring the first storing space in the horizontal direction with the first portion 221 interposed therebetween. Accordingly, the color filters 230 have a striped arrangement of the sequence of green, red, and blue. Here, the height of the color filters 230 may be in the range of about 1-3 μm.

The light blocking member 220 further includes fourth portions 227a and 227b disposed on the thin film transistors Qa and Qb. The fourth portions 227a and 227b block light that is incident on the channels of the thin film transistors Qa and Qb. In the drawings, the fourth portions 227a and 227b are separated from the first portions 221 and are formed as islands but they may be connected to the first portions 221 in other embodiments.

Here, the height of the light blocking member 220 is in the range of 1.5-4 μm to prevent the ink for the color filters from overflowing, and the width of the light blocking member 220 may be variously changed according to necessity. The color filters 230 are finally formed with a height of about 1-3 μm, but because the ink for the color filter includes a required solvent for the liquid as well as the solid content of the color filter, the ink is formed with a height of about 10 μm in the Inkjet process. When the height of the light blocking member 220 is less than 1.5 μm, the ink overflows the light blocking member 220 and may inflow to inside the portion for the formation of the contact hole. Also, if the height of the light blocking member 220 is less than 1.5 μm, the function for preventing the light transmission is deteriorated, thereby losing the function as a light blocking member. Here, the height of the ink becomes about 10 μm such that it is more than several times the height of the light blocking member 220, but the ink does not overflow the light blocking member 220 due to surface tension of the ink. When the height of the light blocking member 220 is more than 4 μm, the differences between the heights of the color filters 230 and the light blocking member 220 are increased such that the high planarity of thin films that will be formed thereafter is deteriorated, and as a result, the cell gap uniformity of the liquid crystal may be compromised.

An overcoat layer 250 is formed on the light blocking member 220 and the color filters 230. The overcoat layer 250 is disposed on the passivation layer 180 covering the storage electrode line 131 between the second portions 223a and 223b, and on the passivation layer 180 covering the end portions of the drain electrodes 175a and 175b protected by the third portions 225a and 225b. The overcoat layer 250 may be preferably made of an inorganic or organic insulating material.

The overcoat layer 250 and the passivation layer 180 have a plurality of contact holes 182l, 182r, 185a, and 185b exposing the end portions 179l and 179r of the data lines 171l and 171r, and the end portions of the drain electrodes 175a and 175b. Also, the overcoat layer 250, the passivation layer 180, and the gate insulating layer 140 have a plurality of contact holes 181 exposing the end portions 129 of the gate lines 121. The contact holes 185a and 185b are disposed inside the third portions 225a and 225b, and are formed by simultaneously etching the overcoat layer 250 and the passivation layer 180. Here, the inflow of the ink is prevented by the third portion 225a and 225b in the portion where the contact holes 185a and 185b are formed in the Inkjet process. Therefore, because the color filters 230 do not exist at the contact holes 185a and 185b, the drain electrodes 175a and 175b may be exposed by simultaneously etching the overcoat layer 250 and the passivation layer 180. For the same reason, although the color filters 230 are formed through the Inkjet process, the contact holes 185a and 185b may be easily formed, and contamination of the chamber and non-uniformity of the etching generated when the color filters 230 are etched may be eliminated.

A plurality of first and second sub-pixel electrodes 191a and 191b and a plurality of contact assistants 81, 82l, and 82r are formed on the overcoat layer 250. They may be made of a transparent conductive material such as ITO or IZO, or a reflective metal such as aluminum, silver, or chromium.

The first sub-pixel electrode 191a and the second sub-pixel electrode 191b are physically and electrically connected to the drain electrodes 175a and 175b through the contact holes 185a and 185b, respectively, and the data voltage is applied from the drain electrodes 175a and 175b to the first and second pixel electrodes 191a and 191b.

Two sub-pixel electrodes 191a and 191b applied with the data voltages generate an electric field along with the common electrode to determine the orientation of liquid crystal molecules of the liquid crystal layer interposed between the electrodes 191 and 270. Here, because the first sub-pixel electrodes 191a receive the data voltages through the left data lines 171l and the second sub-pixel electrodes 191b receive the data voltages through the right data lines 171r, different voltage may be applied thereto. In this way, if the different voltages are applied, the arrangement of the liquid crystal of the corresponding regions becomes different. Accordingly, when the voltages applied to the first and second sub-pixel electrodes 191a and 191b are appropriately adjusted, it is possible to make an image viewed from the side be as similar as possible to an image viewed from the front. That is, it is possible to improve the side visibility of the liquid crystal display. Here, it is preferable that the absolute value of the voltage applied to the first sub-pixel electrode 191a having a wider area among the first sub-pixel electrodes 191a and the second sub-pixel electrodes 191b is higher than the absolute value of the voltage applied to the second sub-pixel electrodes 191b to improve the side visibility.

The first sub-pixel electrodes 191a have a plurality of cutouts, and the cutouts and a gap 94 between the first sub-pixel electrode 191a and the second sub-pixel electrode 191b generate horizontal components of the electric field along with cutouts of a common electrode (not shown) formed on a display panel (not shown) facing the thin film transistor array panel or protrusions (not shown) formed on the common electrode to control the arrangement operation of the liquid crystal.

The sub-pixel electrodes 191a and 191b and the common electrode form a capacitor (hereinafter referred to as "liquid crystal capacitor") to maintain the applied voltage even after the thin film transistor is turned off. To enhance the voltage storage capacity, a storage capacitor coupled to the liquid crystal capacitor in parallel is formed by overlapping the first and second sub-pixel electrodes 191a and 191b, and the storage electrode lines 131. Here, because the color filters 230 do not exist between the storage electrodes 137 and the first and second sub-pixel electrodes 191a and 191b, the capacitance of the storage capacitor is increased. If it is preferable that the capacitance of the storage capacitor is small, the second portions 223a and 223b of the light blocking member 220 for preventing the color filters 230 from being formed on the storage electrode 137 are not necessary. In this case, the color filters 230 are formed on the storage electrodes 137 such that the color filters 230 are disposed between the first and second sub-pixel electrodes 191a and 191b, and the storage electrode 137, thereby reducing the capacitance of the storage capacitor. A kick-back voltage may be increased due to the reduction of the storage capacitance, but this may be solved by decreasing the size of the thin film transistor to reduce the parasitic capacitance generated between the gate electrode and the drain electrode thereof, or by using a liquid crystal material having a large dielectric constant to increase the liquid crystal capacitance.

A pair of first and second subpixel electrodes 191a and 191b forming one pixel electrode are engaged with each other with the gap 94 therebetween. The shape of the pixel electrodes 191 may be variously changed.

Next, the manufacturing method of the thin film transistor array panel will be described in detail.

Figure 5:
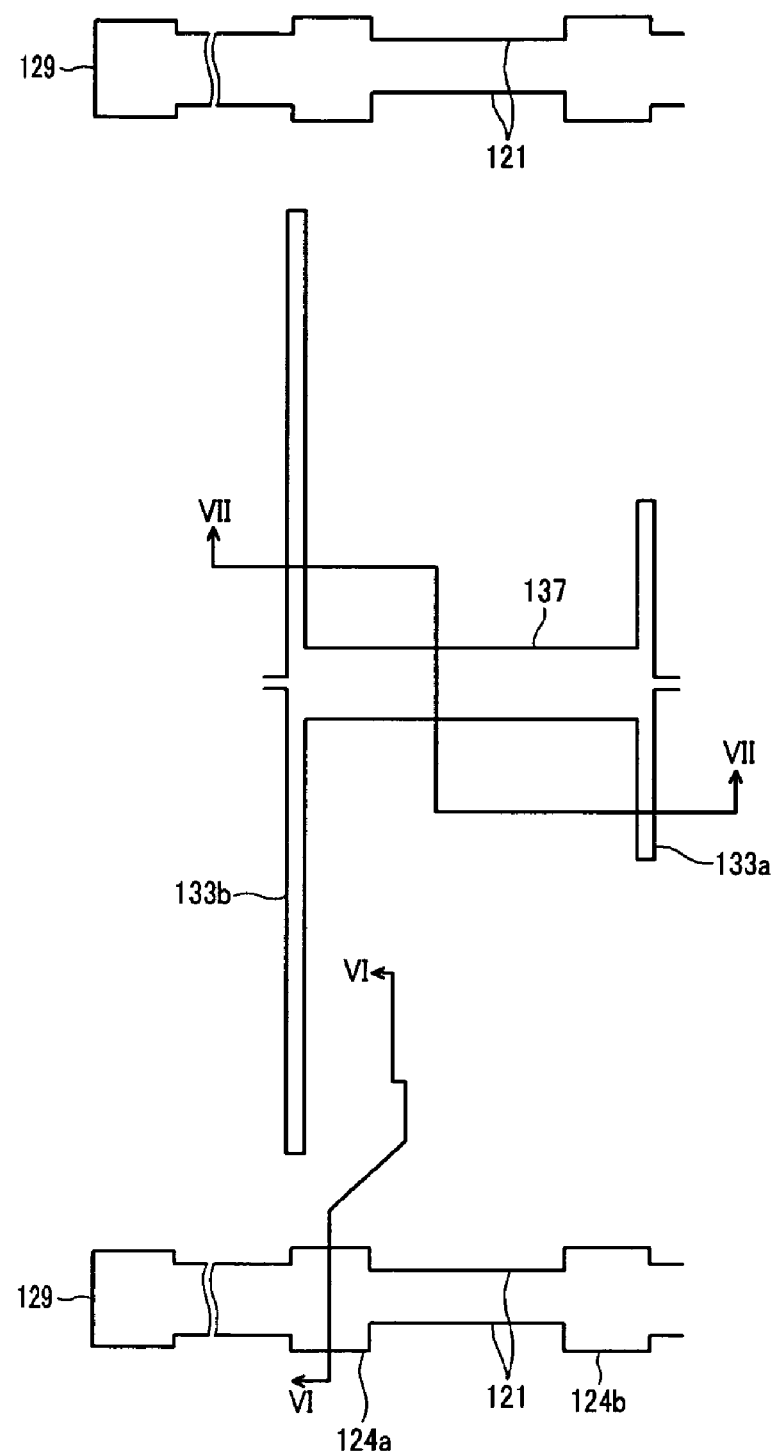
FIG. 5, FIG. 8, and FIG. 11 are layout views sequentially illustrating the manufacturing process of the thin film transistor array panel shown in FIG. 1 according to the exemplary embodiment of the present invention.
Figure 6:
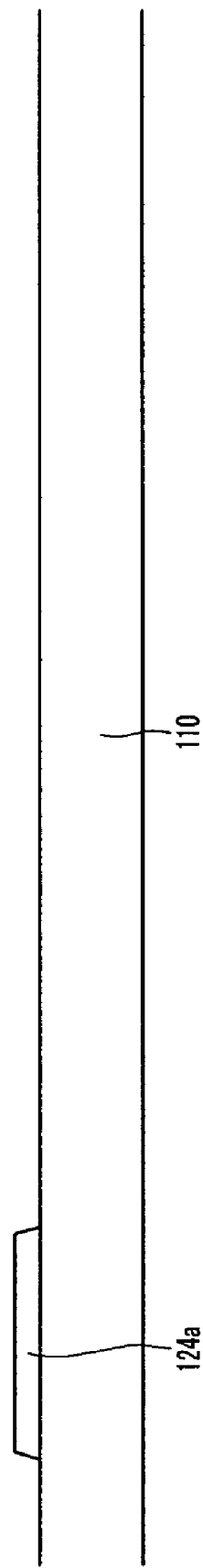
FIG. 6 and FIG. 7 are cross-sectional views respectively taken along the lines VI-VI and VII-VII of FIG. 5.
Figure 7:
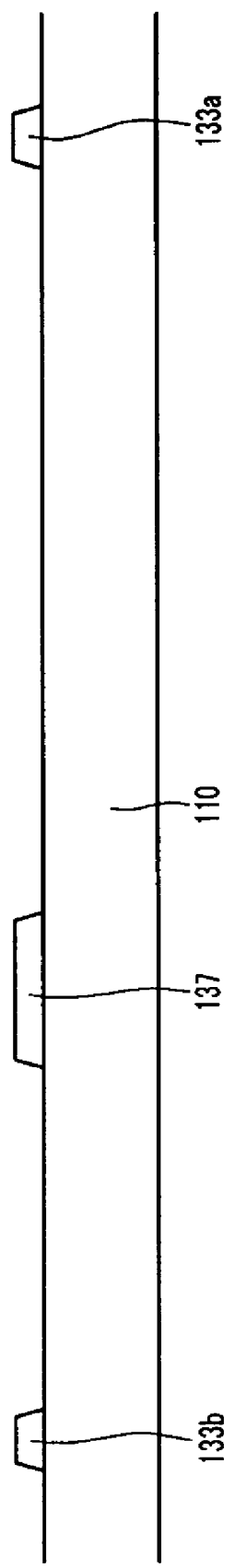
Figure 8:
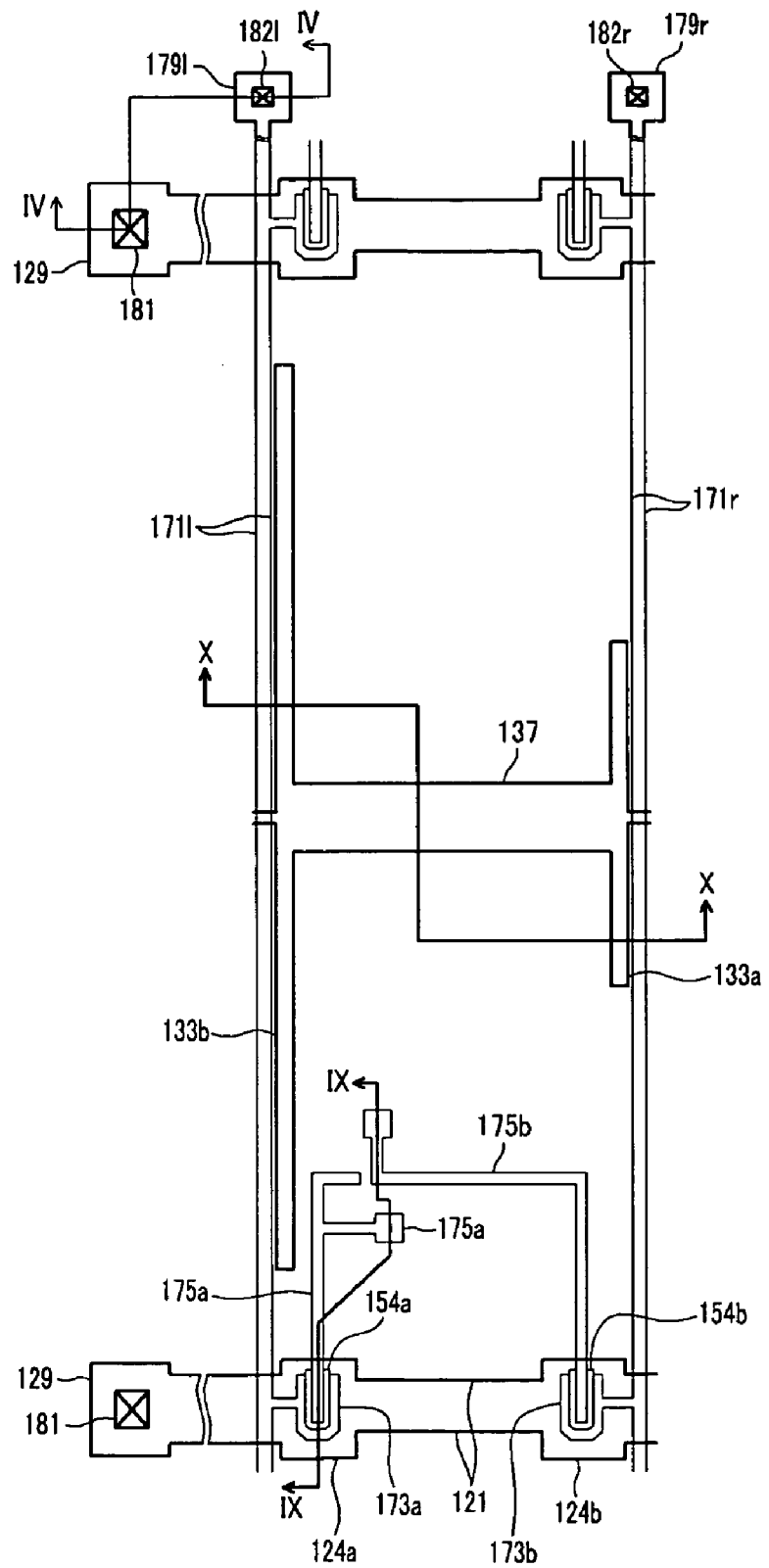
Figure 9:
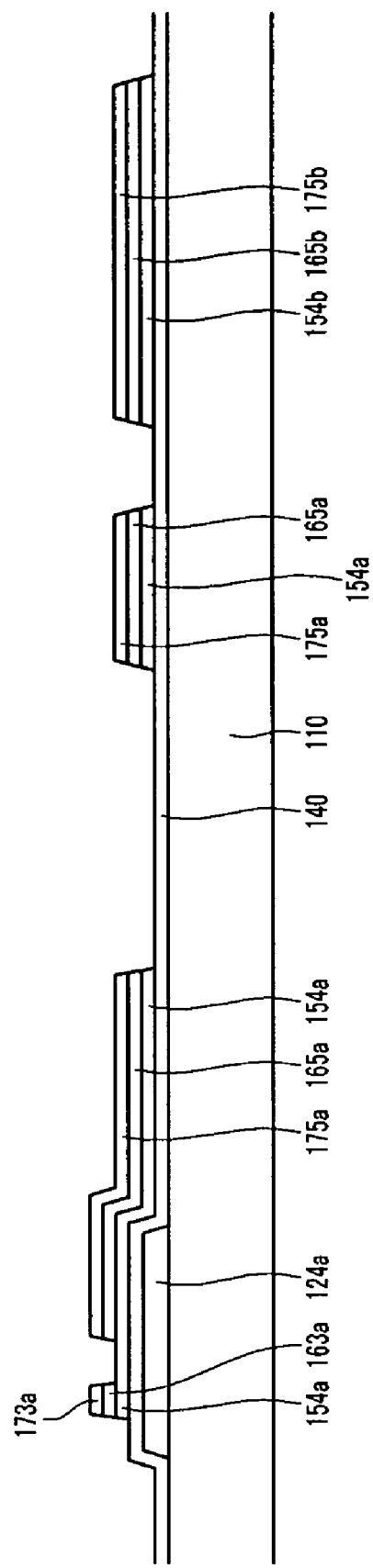
FIG. 9 and FIG. 10 are cross-sectional views respectively taken along the lines IX-IX and X-X of FIG. 8.
Figure 10:
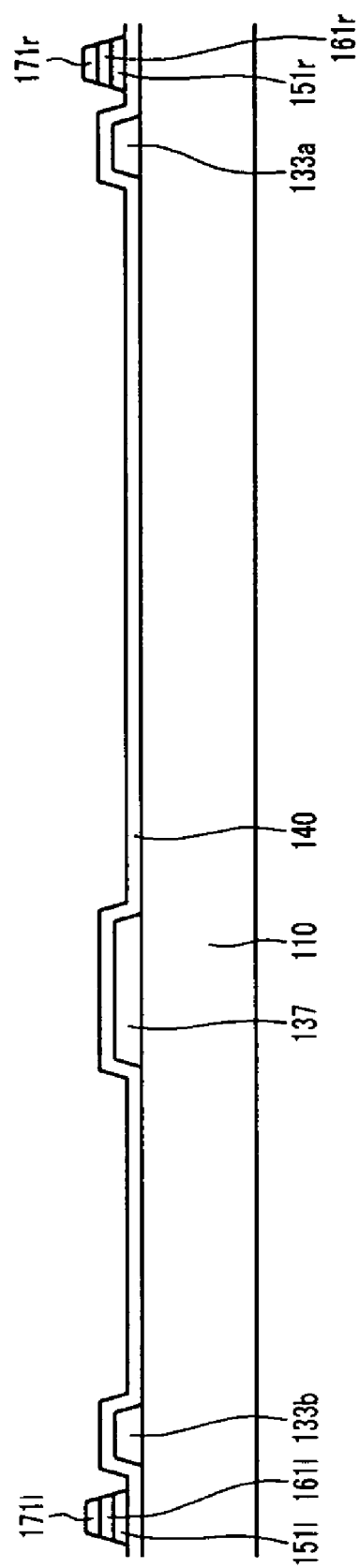
Figure 11:
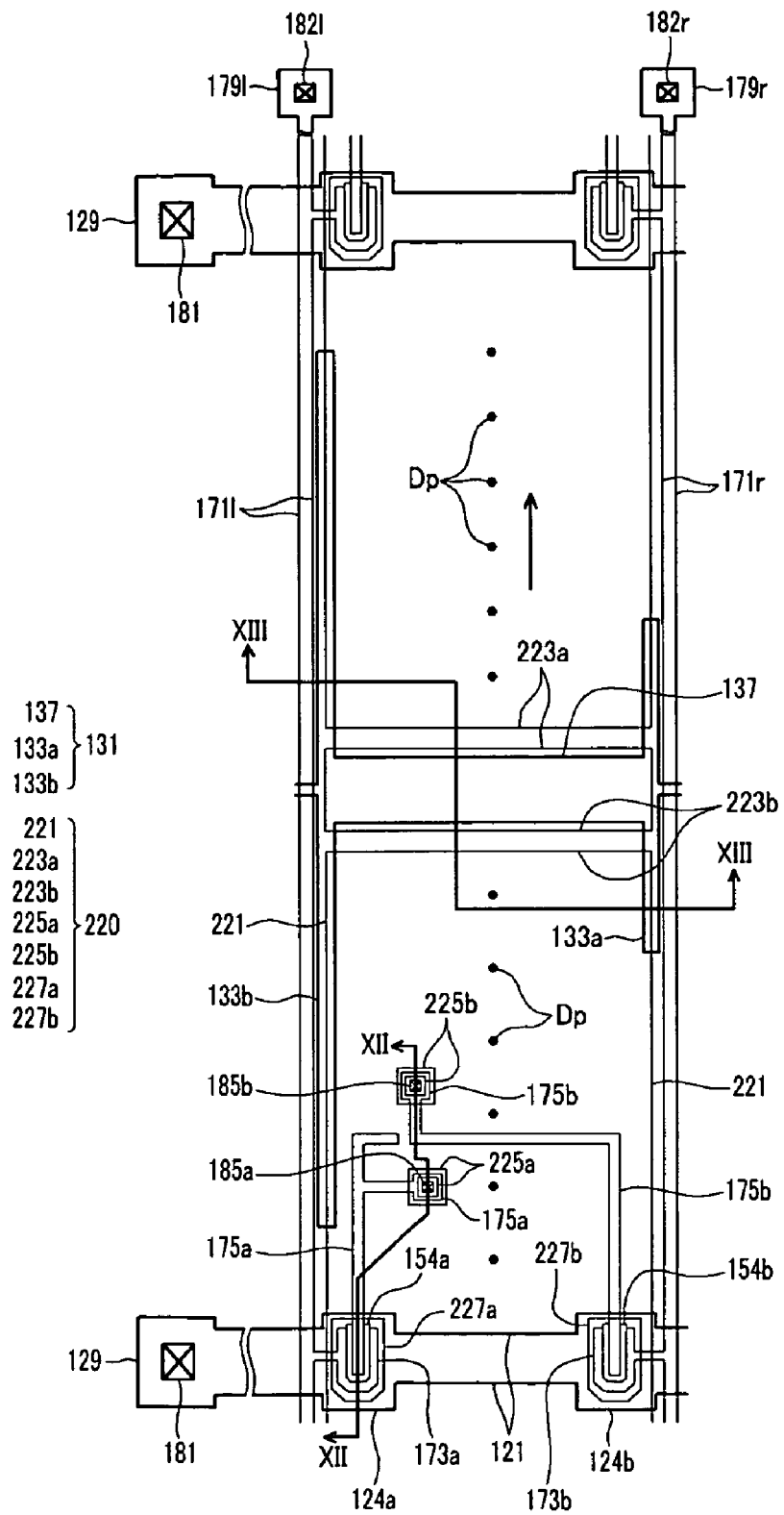
Figure 12:
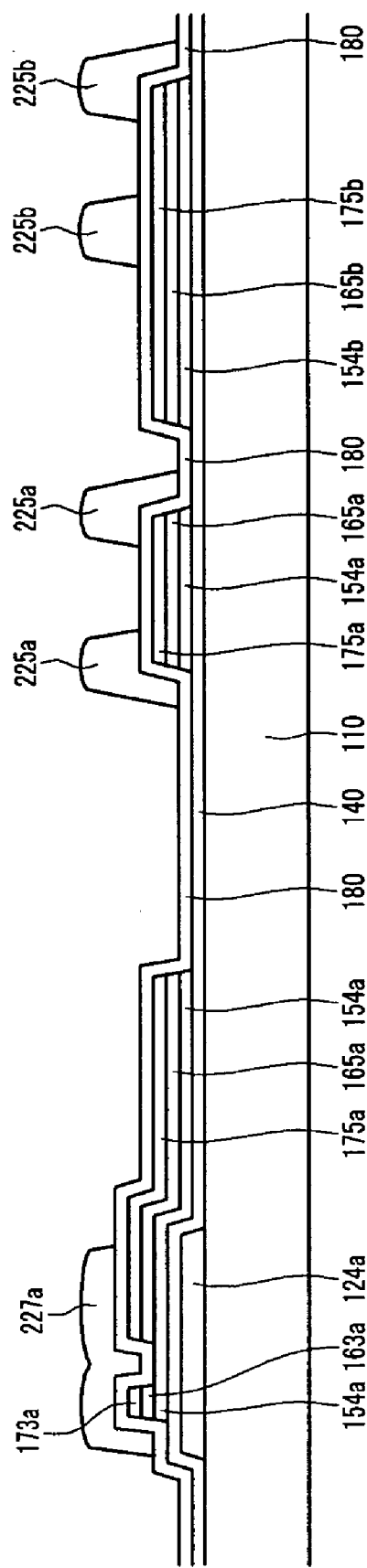
FIG. 12 and FIG. 13 are cross-sectional views respectively taken along the lines XII-XII and XIII-XIII of FIG. 11.
Figure 13:
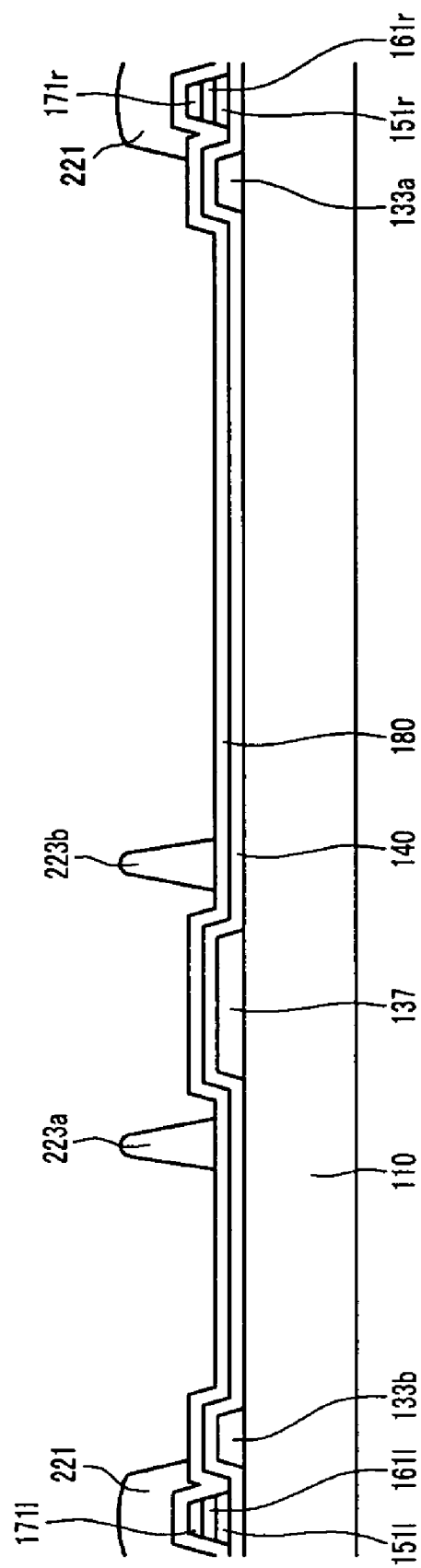
Figure 14:
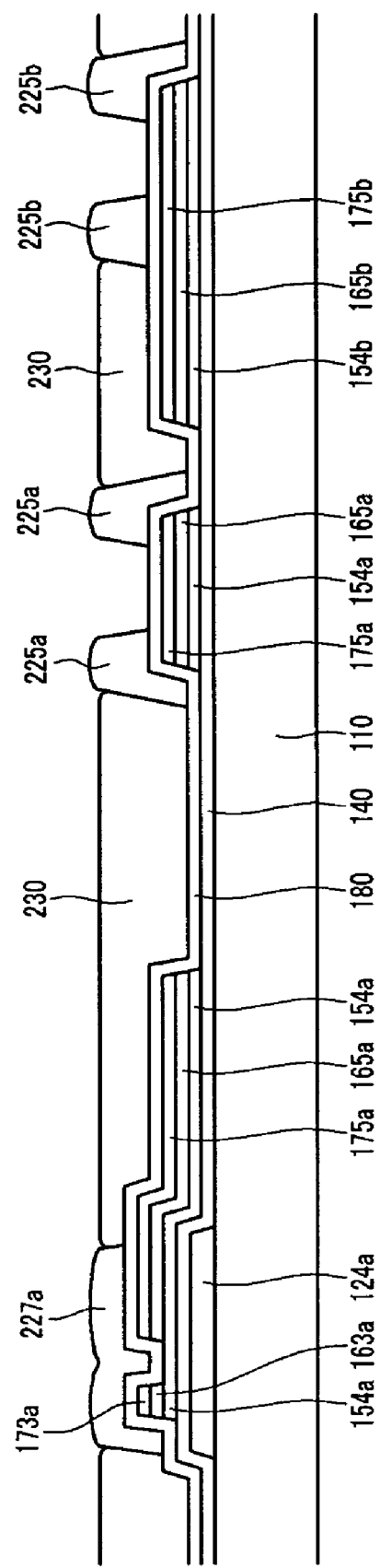
FIG. 14 and FIG. 15 are cross-sectional views respectively taken along the lines XII-XII and XIII-XIII of FIG. 11 and showing the formation of color filters.
Figure 15:
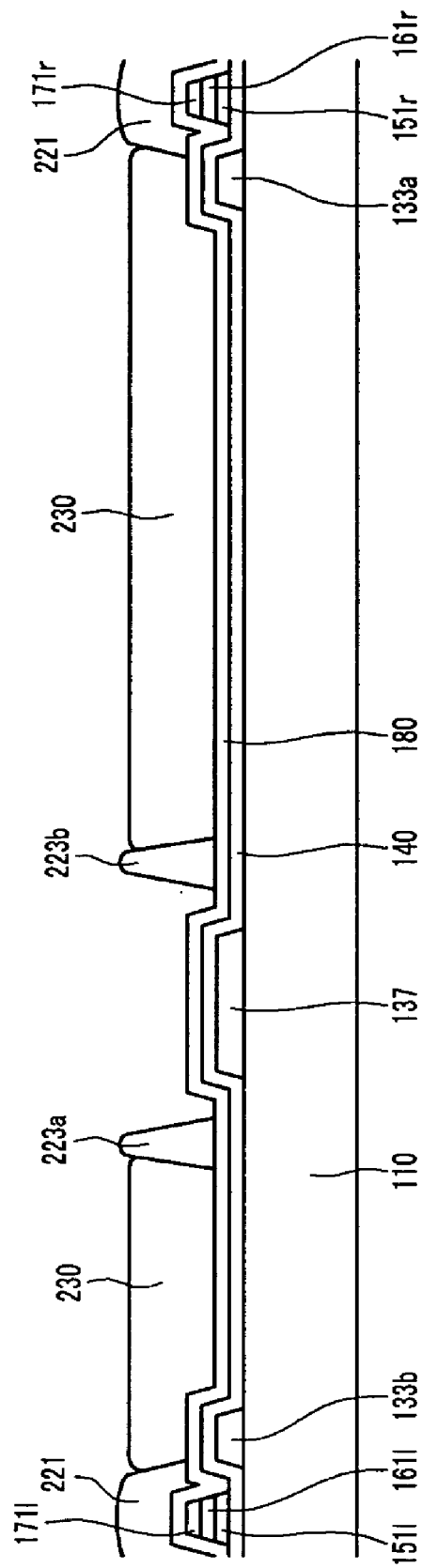
Figure 16:
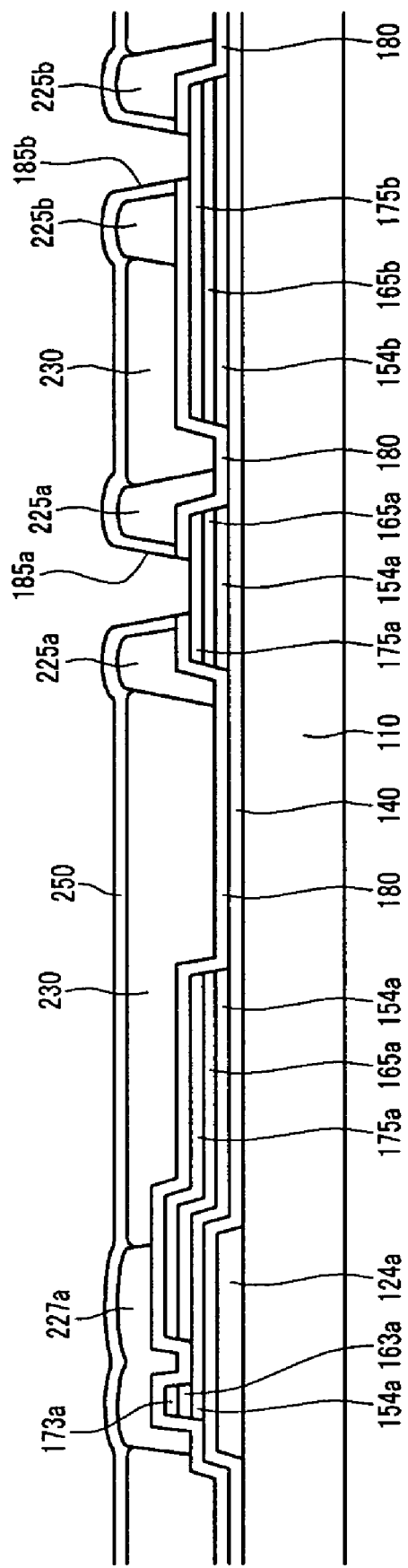
FIG. 16 and FIG. 17 are cross-sectional views showing the formation of an overcoat layer on the color filters shown in FIG. 14 and FIG. 15.
Figure 17:
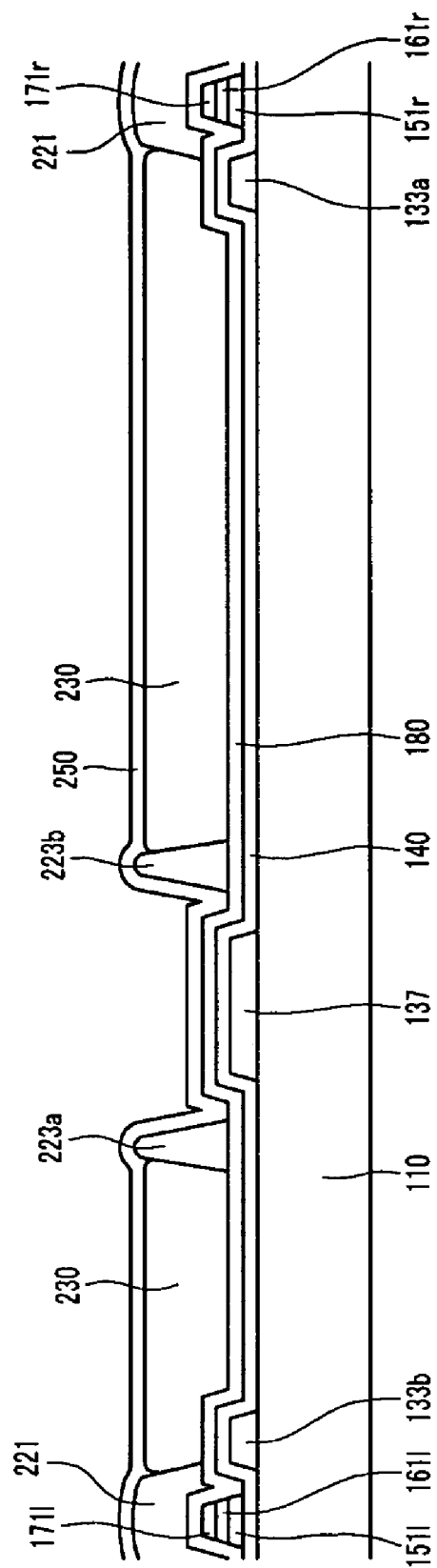

FIG. 5 to FIG. 7 are views showing formation of a gate line and a storage electrode line, FIG. 8 to FIG. 10 are views showing formation of a data line and a drain electrode, FIG. 11 to FIG. 13 are views showing formation of a light blocking member, FIG. 14 and FIG. 15 are views showing formation of a color filter, and FIG. 16 and FIG. 17 are views showing formation of an overcoat layer.

First, as shown in FIG. 5 to FIG. 7, a metal layer such as aluminum-neodymium (Al—Nd) or molybdenum (Mo) is deposited on an insulating substrate 110 and patterned through photolithography to form a plurality of gate lines 121 including a plurality of gate electrodes 124a and 124b and a plurality of end portions 129, and a plurality of storage electrode lines 131 including a plurality of branches 133a and 133b and a plurality of storage electrodes 137.

Next, as shown in FIG. 8 to FIG. 10, after forming a gate insulating layer 140 on the gate lines 121 and the storage electrode lines 131, a semiconductor layer, an ohmic contact layer, a data metal layer, and a photosensitive film are sequentially deposited, and the photosensitive film is exposed and developed through a photo-process using a half-tone mask to form a photosensitive film pattern having different thicknesses depending on position. Here, in the photosensitive film pattern, the thickness of a portion corresponding to the portion where the data lines 171l and 171r and the drain electrodes 175a and 175b will be formed is thick, and the thickness of a portion corresponding to the portion between the source electrodes 173a and 173b and the drain electrodes 175a and 175b is thin. Next, the data metal layer, the ohmic contact layer, and the semiconductor layer are etched by using the photosensitive film pattern as an etch mask to form a preliminary data line, a preliminary ohmic contact, and the plurality of semiconductor stripes 151l and 151r, and the photosensitive film pattern is ashed to remove a thin portion among the photosensitive film pattern corresponding to the portion between the source electrodes 173a and 173b, and the drain electrodes 175a and 175b. Next, the preliminary data line and the preliminary ohmic contact are etched by using the ashed photosensitive film pattern as an etch mask to form a plurality of data lines 171l and 171r and a plurality of drain electrodes 175a and 175b, and a plurality of ohmic contacts 161l, 161r, 165a, and 165b thereunder.

Next, as shown in FIG. 11 to FIG. 13, a photoresist in which black color pigments are dispersed is coated, exposed, and developed to form a light blocking member 220 including a plurality of first portions 221, a plurality of second portions 223a and 223b, a plurality of third portions 225a and 225b, and a plurality of fourth portions 227a and 227b to define a storing space for providing an ink. Here, the light blocking member 220 has a height of about 1.5-4 μm, and may be made of an organic material having excellent heat resistance. The height of the ink is about 10 μm in the inkjet process for a color filter because when the height of the light blocking member 220 is less than 1.5 μm, the ink overflows onto the light blocking member 220 and may flow into the portion where the contact holes will be formed. Here, the height of the ink becomes about 10 μm such that the height thereof is several times more than the height of the light blocking member 220, but the light blocking member 220 is not overflowed with the ink due to the surface tension of the ink. When the height of the light blocking member 220 is more than 4 μm, the difference between the heights of the light blocking member 220 and the color filters 230 is increased such that the surface evenness of thin films that will be formed thereafter is deteriorated, and the uniformity of the liquid crystal cell gap is compromised.

When the light blocking member 220 is made of a non-photosensitive organic material, it is patterned through photolithography.

Next, as shown in FIG. 11, FIG. 14, and FIG. 15, a plurality of color filters 230 are formed in the storing space through an Inkjet process. The ink is supplied to the storing space according to dripping points in an arrow direction that a nozzle (not shown) is moved, and flows in all directions while being filled in the storing space. In this process, because the second portions 223a and 223b are disposed with the storage electrode 137 interposed therebetween, and the third portions 225a and 225b enclose the end portions of the drain electrodes 175a and 175b corresponding to the contact holes, the ink does not flow inside the upper portion of the storage electrode 137, or the inner portion of the third portions 225a and 225b, that is, the portion where the contact holes are positioned. On the other hand, because the ink stored in the storing space through the Inkjet process is liquid, the ink may flow over the second portions 223a and 223b or the third portion 225a and 225b. Accordingly, the physical properties such as viscosity and surface tension may be controlled, or the heights and the thicknesses of the second portions 223a and 223b or the third portions 225a and 225b may be controlled to prevent the ink from overflowing.

Next, as shown in FIG. 16 and FIG. 17, an overcoat layer 250 is formed on the color filters 230, and the overcoat layer 250 and the passivation layer 180 are simultaneously patterned through photolithography to form a plurality of contact holes 185a and 185b enclosed by the third portions 225a and 225b. In this way, because the inner portion of the third portions 225a and 225b in the Inkjet process is protected by the third portion 225a and 225b such that the color filters 230 do not exist, the contact holes 185a and 185b may be easily formed through one photolithography step.

Next, a plurality of first and second sub-pixel electrodes 191a and 191b, and a plurality of contact assistants 81, 82l, and 82r are formed on the overcoat layer 250.

Exemplary Embodiment 2

Figure 19:
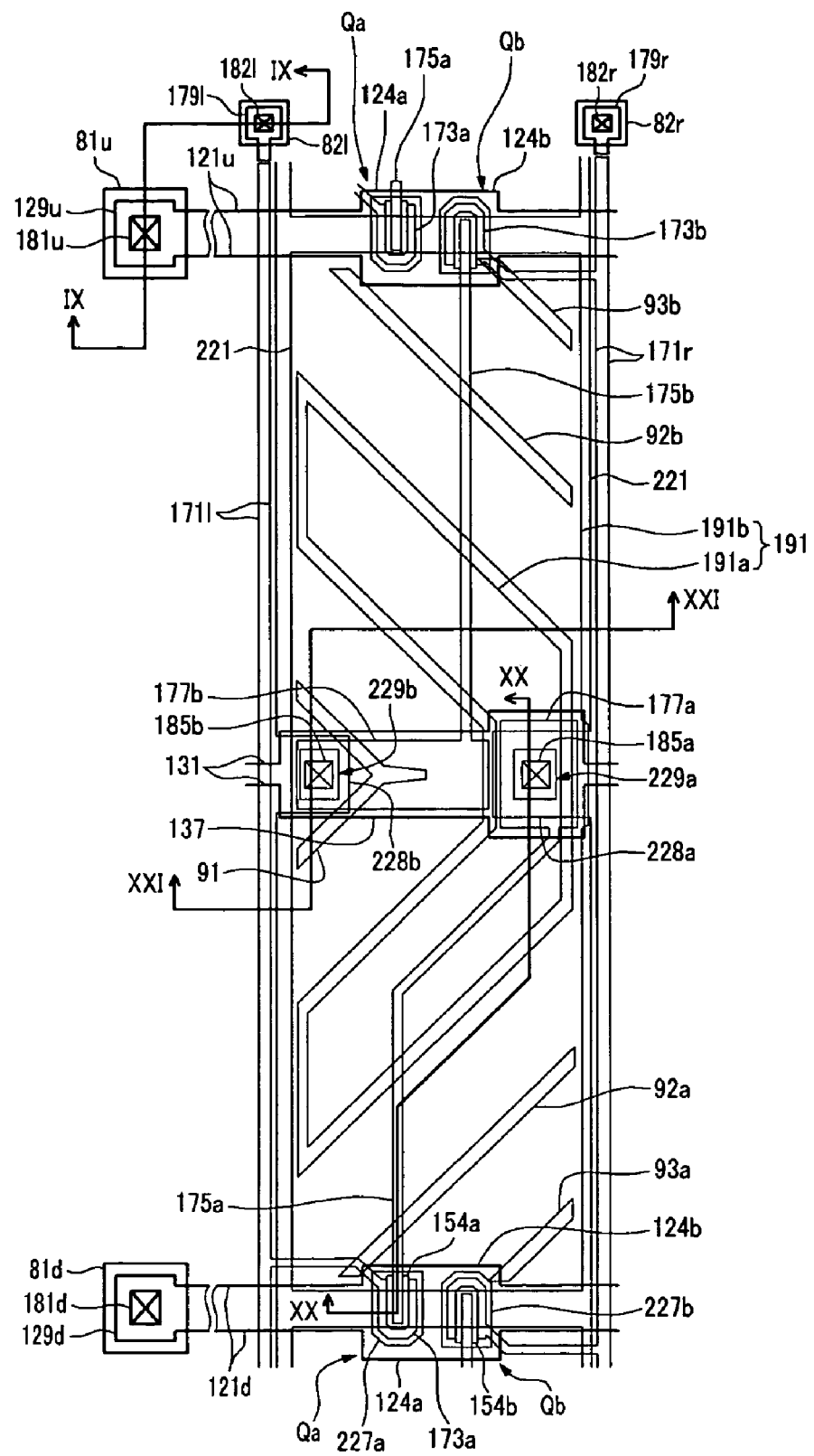
FIG. 19 is a layout view of a thin film transistor array panel according to a second exemplary embodiment of the present invention.
Figure 20:
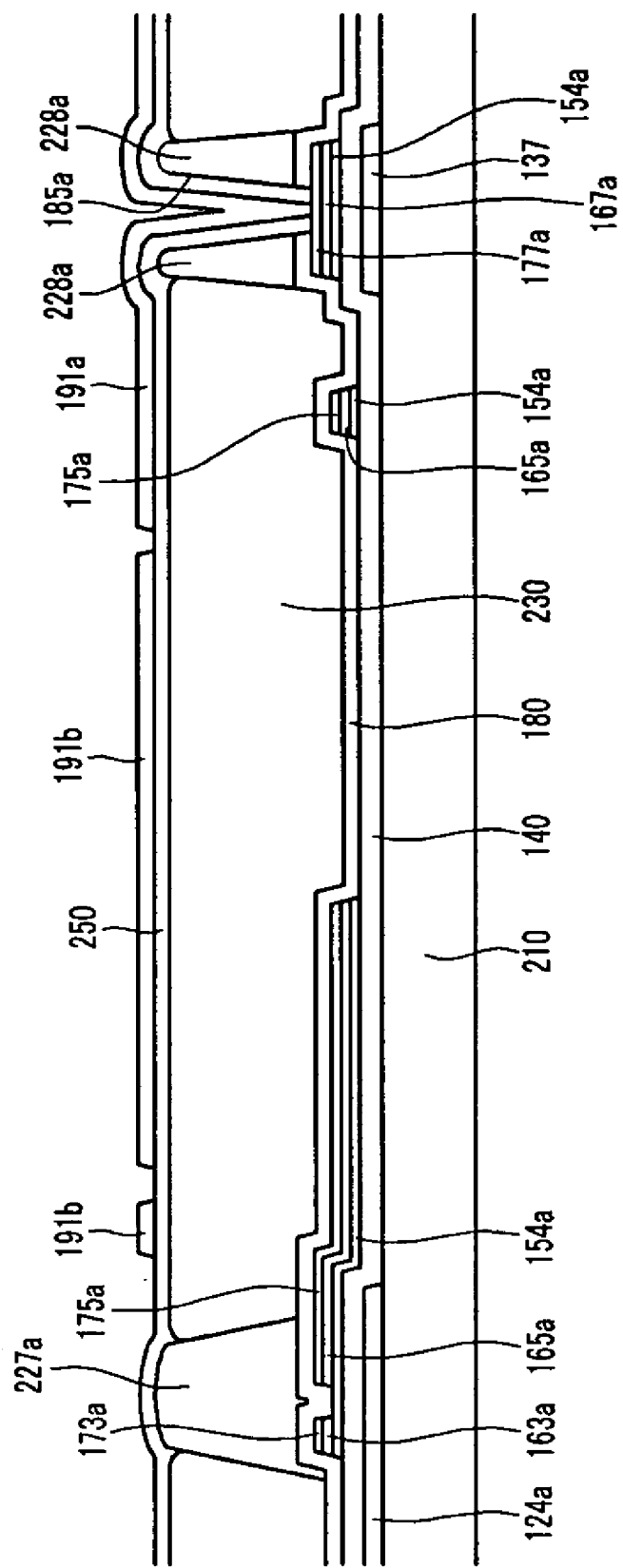
FIG. 20 is a cross-sectional view taken along the line XX-XX of FIG. 19.
Figure 21:
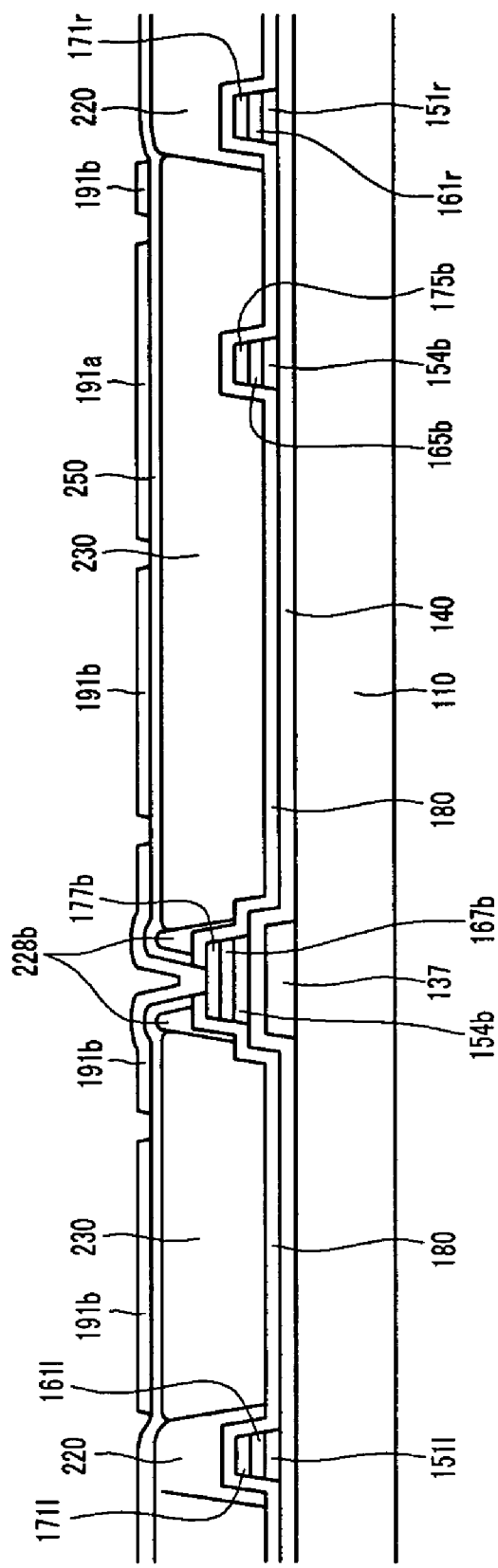
FIG. 21 is a cross-sectional view taken along the line XXI-XXI of FIG. 19.
Figure 22:
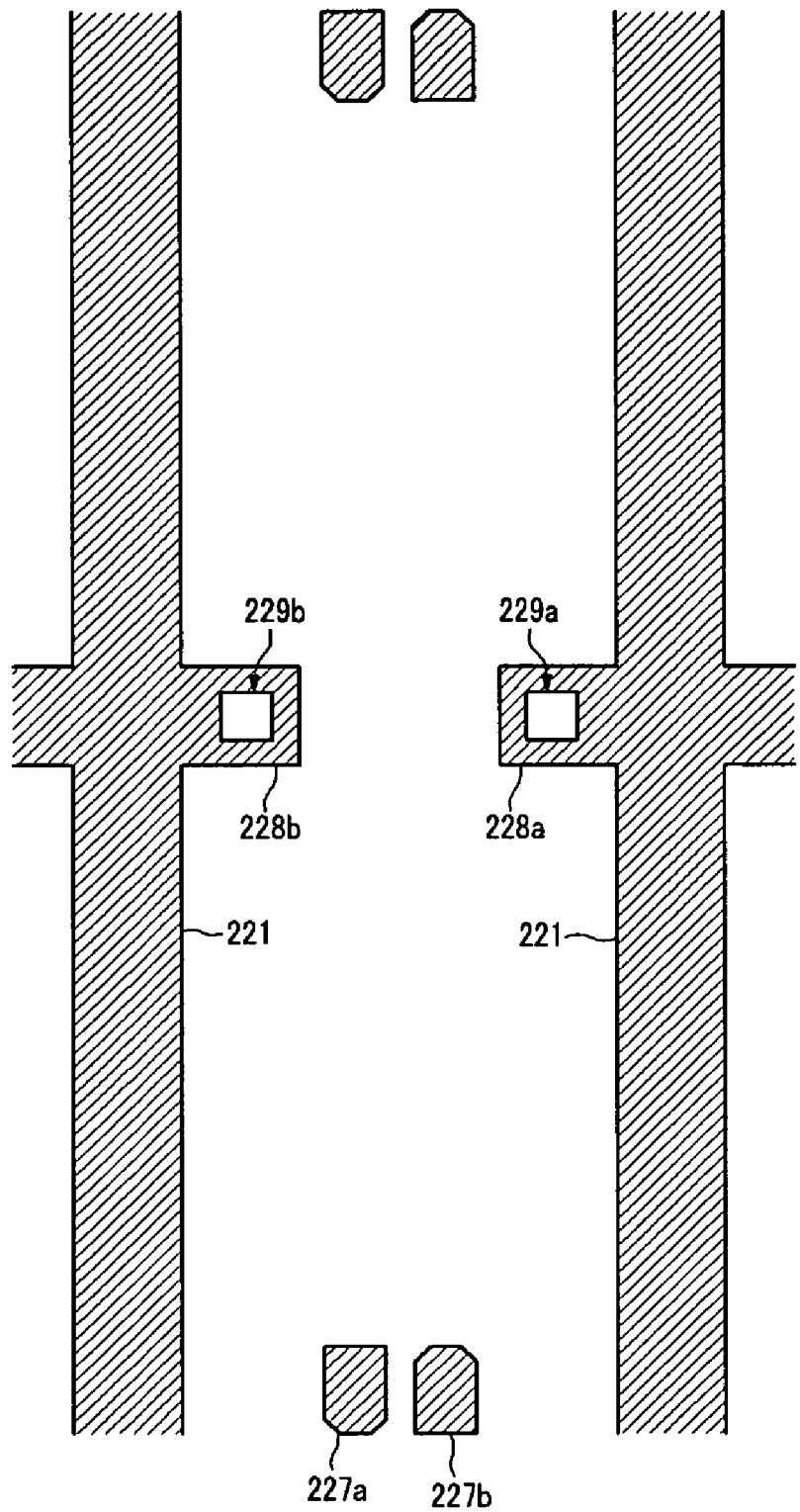
FIG. 22 is a layout view only showing an organic light blocking member in the thin film transistor array panel shown in FIG. 19.

Next, a thin film transistor array panel according to the second exemplary embodiment of the present invention will be described with the accompanying drawings. A thin film transistor array panel according to the second exemplary embodiment includes differences such as the shapes of a light blocking member, a storage electrode, source and drain electrodes, a pixel electrode, and the connection of the pixel electrode and a thin film transistor, compared with the first exemplary embodiment. Hereafter, the second exemplary embodiment is mainly described through the differences, with the accompanying drawings. FIG. 19 is a layout view of a thin film transistor array panel according to a second exemplary embodiment of the present invention, FIG. 20 is a cross-sectional view taken along the line XX-XX of FIG. 19, FIG. 21 is a cross-sectional view taken along the line XXI-XXI of FIG. 19, and FIG. 22 is a layout view only showing an organic light blocking member in the thin film transistor array panel shown in FIG. 19.

In the thin film transistor array panel according to the second exemplary embodiment of the present invention, a plurality of gate lines 121u and 121d, and a plurality of storage electrode lines 131 including a plurality of storage electrodes 137 are formed on an insulating substrate 110, and a gate insulating layer 140 is formed thereon. The storage electrode line 131 is disposed the same distance away from each of the two neighboring gate lines 121u and 121d. The gate lines 121u and 121d are substantially similar. However, for better comprehension and ease of description in FIG. 19, the gate line 121u disposed in the upper side of the pixel and the gate line 121d disposed in the lower side are indicated by different numbers. The gate lines 121u and 121d respectively include wide end portions 129u and 129d.

A plurality of semiconductor stripes 151l and 151r are formed on the gate insulating layer 140. A plurality of ohmic contact stripes and islands 161l, 161r, 165a, 165b, 167a, 167b are formed on the semiconductor stripes 151l and 151r. The ohmic contact stripes 161l and 161r have a plurality of protrusions 163a and 163b. The protrusions 163a and 163b and the ohmic contact islands 165a and 165b form a pair and are disposed on the projections 154a and 154b of the semiconductor stripe 151. The ohmic contact islands 167a and 167b are respectively elongated portions from the ohmic contact islands 165a and 165b.

A plurality of left and right data lines 171l and 171r and a plurality of first and second drain electrodes 175a and 175b are formed on the ohmic contacts 161l, 161r, 165a, and 165b.

The first and second drain electrodes 175a and 175b respectively include wide end parts 177a and 177b, and a bar-shaped end part. The wide end parts 177a and 177b are respectively closed to the right and the left data lines 171r and 171l and are overlapped with the storage electrodes 137, respectively, and a part of the bar-shaped end part is surrounded with the curved source electrodes 173a and 173b with a "U" shape.

The first drain electrode 175a starts on the gate line 121d of the lower side of the pixel, runs upward (in the pixel), is curved in an oblique direction, and forms a wide end portion 177a positioned on the storage electrode 137 and neighboring the right data line 171r. The second drain electrode 175b starts on the gate line 121u of the upper side of the pixel, runs downward (in the pixel), and forms a wide end portion 177b positioned on the storage electrode 137 and neighboring the left data line 171r.

A passivation layer 180 is formed on the data lines 171l and 171r and the drain electrodes 175a and 175b.

A light blocking member 220 is formed on the passivation layer 180. The light blocking member 220 includes a first portion 221 extending in a vertical direction adjacent the data lines 171l and 171r, protrusions 228a and 228b protruded in right and left directions from the first portion 221, and second portions 227a and 227b covering the channels of the thin film transistors Qa and Qb. The first portion 221 extends adjacent the data lines 171l and 171r according to the data lines 171l and 171r in the vertical direction, and forms a dam. Referring to FIG. 22, the light blocking member 220 defines a plurality of spaces with a stripe shape for storing color filters 230, and forms a plurality of storing spaces that extend in the vertical direction.

The protrusions 228a and 228b of the light blocking member 220 respectively include openings 229a and 229b. The protrusions 228a and 228b extend from the first portion 221 toward the storage electrode 137. In this way, the protrusions 228a and 228b include the openings 229a and 229b, and contact holes 185a and 185b are respectively formed in the openings 229a and 229b.

Here, the height of the light blocking member 220 is in the range of 1.5-4 μm for preventing the ink for the color filters from overflowing, and the width of the light blocking member 220 may be variously changed according to necessity.

Because the light blocking member 220 extend in the vertical direction and forms dams, the color filters 230 may be formed by depositing the ink in the storing spaces in the Inkjet process. Here, the protrusions 228a and 228b are disposed on the portions where the contact holes 185a and 185b are formed such that they may prevent the color filters 230 from remaining.

An overcoat layer 250 is formed on the light blocking member 220 and the color filters 230. Also, the overcoat layer 250 is formed in a portion enclosed by the protrusions 228a and 228b of the light blocking member 220.

The overcoat layer 250 and the passivation layer 180 have a plurality of contact holes 182l, 182r, 185a, and 185b respectively exposing the end portions 179l and 179r of the data lines 171l and 171r and the end portions 177a and 177b of the drain electrodes 175a and 175b. Also, the overcoat layer 250, the passivation layer 180, and the gate insulating layer 140 have a plurality of contact holes 181u and 181d respectively exposing the end portions 129u, and 129d of the gate lines 121u and 121d.

The contact holes 185a and 185b are disposed in the openings 229a and 229b of the protrusions 228a and 228b, and are formed by simultaneously etching the overcoat layer 250 and the passivation layer 180. Here, the inflow of the ink is prevented by the protrusions 228a and 228b on the portions where the contact holes 185a and 185b are formed in the Inkjet process. Accordingly, because the color filters 230 do not exist on the portion where the contact holes 185a and 185b are disposed, the passivation layer 180 and the overcoat layer 250 may be simultaneously etched to easily expose the drain electrodes 175a and 175b.

A plurality of first and second sub-pixel electrodes 191a and 191b and a plurality of contact assistants 81u, 81d, 82l, and 82r are formed on the overcoat layer 250. Each second sub-pixel electrode 191b has a plurality of openings 91, 92a, 92b, 93a, and 93b They may be preferably made of a transparent conductive material such as ITO or IZO, or a reflective metal such as aluminum, silver, or alloys thereof.

On the other hand, storage capacitors are formed by overlapping the end portions 177a and 177b of the drain electrodes 175a and 175b, and the storage electrodes 137. Compared to this, the storage capacitor in the first exemplary embodiment is formed by overlapping the sub-pixel electrodes 191a and 191b, and the storage electrodes 137. Accordingly, the second portions 223a and 223b are required for preventing the color filters 230 from forming on the storage electrode 137 when forming the storage capacitor in the first exemplary embodiment, but a light blocking member as in the first exemplary embodiment is not necessary in the second exemplary embodiment. Also, because the contact holes 185a and 185b are formed adjacent to the data lines 171l and 171r on the storage electrodes 137 in the second exemplary embodiment, the second exemplary embodiment may reduce a loss of aperture ratio compared with the first exemplary embodiment. Further, as shown in FIG. 22, the plurality of storing spaces filled by the color filters 230 are connected into one in the whole pixel column. Accordingly, it is easily to deposit or to spread the ink.

Exemplary Embodiment 3

Figure 23:
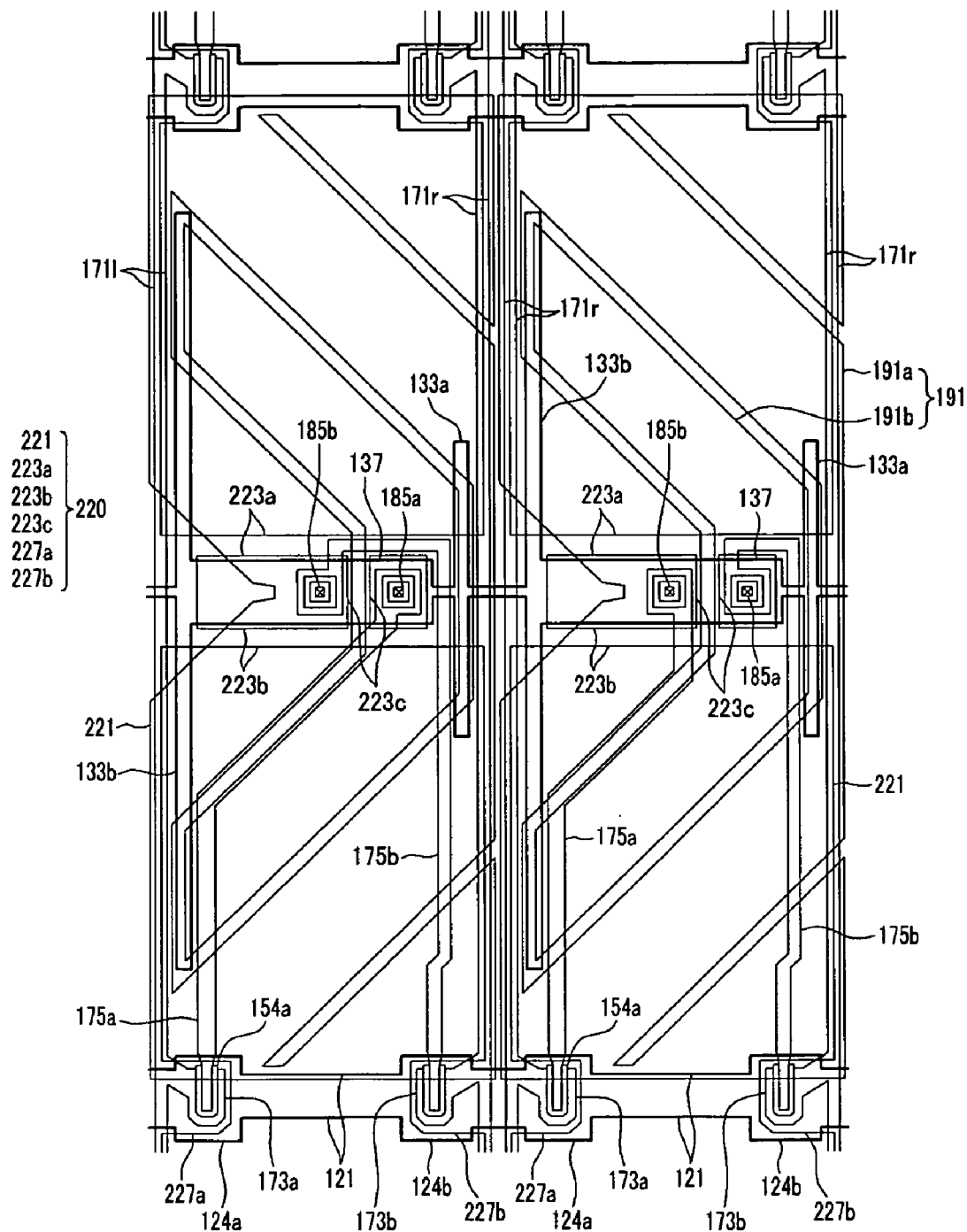
FIG. 23 is a layout view of a thin film transistor array panel according to a third exemplary embodiment of the present invention.
Figure 24:
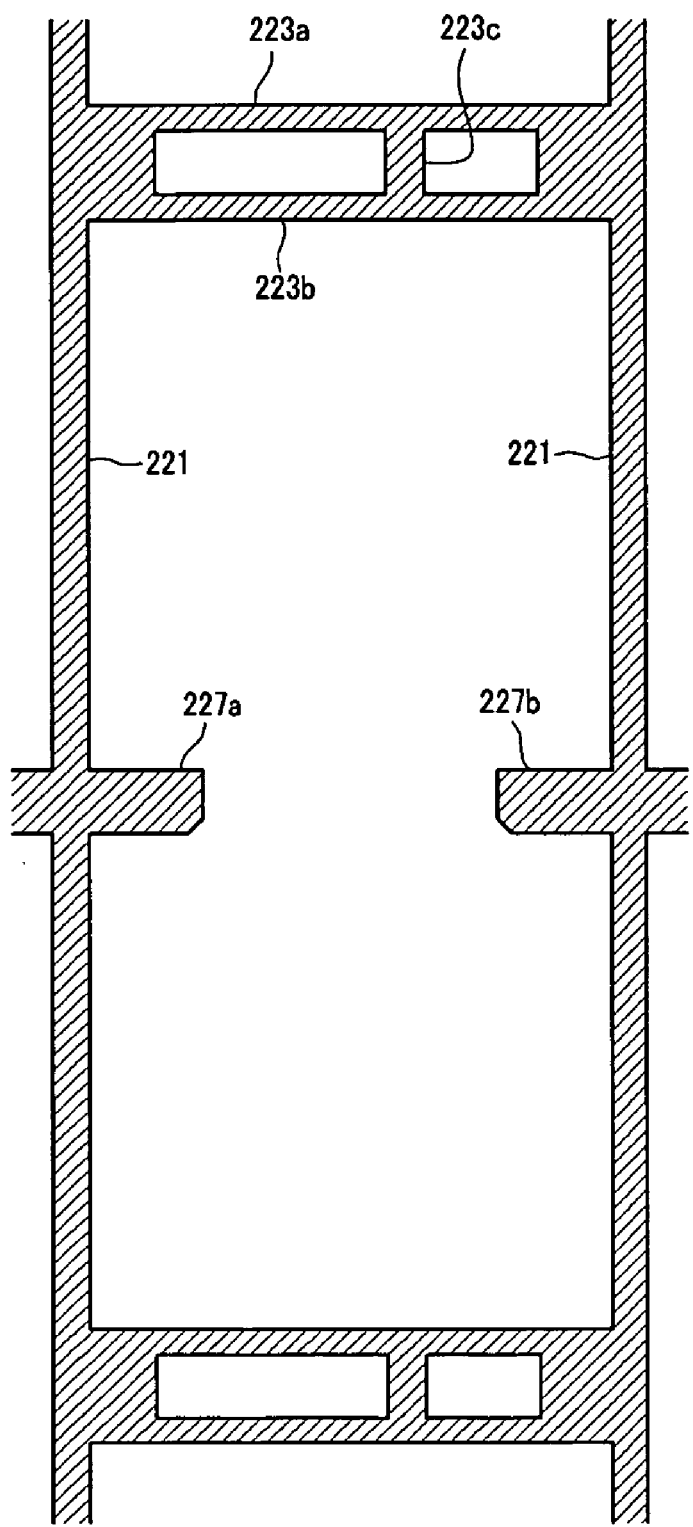
FIG. 24 is a layout view only showing an organic light blocking member in the thin film transistor array panel shown in FIG. 23.

The layered structure of the thin films in the thin film transistor array panel according to the third exemplary embodiment is the same as that of the first and second exemplary embodiments, and there are differences such as the disposition of the drain electrode 175a and 175b and the thin film transistors, the shape of the sub-pixel electrodes 191a and 191b, the positions of the contact holes 185a and 185b, and the shape of the light blocking member 220. Hereafter, the third exemplary embodiment will be mainly described with the accompanying drawings with respect to the differences. FIG. 23 is a layout view of a thin film transistor array panel according to a third exemplary embodiment of the present invention and FIG. 24 is a layout view only showing an organic light blocking member in the thin film transistor array panel shown in FIG. 23.

A plurality of gate lines 121 and a plurality of storage electrode lines 131 are formed on an insulating substrate. The gate lines 121 include a plurality of gate electrodes 124a and 124b, and the storage electrode lines 131 include a plurality of branches 133a and 133b extending in a vertical direction and a plurality of storage electrodes 137. The storage electrode lines 131 are positioned the same distance away from each of the two neighboring gate lines 121.

A plurality of left and right data lines 171l and 171r are formed by intersecting the gate lines 121 and the storage electrode lines 131. Two gate electrodes 124a and 124b are disposed close to the left and right data lines 171l and 171r, two protrusions 154a and 154b of the semiconductor stripes are disposed on the gate electrodes 124a and 124b, and two source electrodes 173a and 173b that are respectively the branches of the left and right data lines 171l and 171r and the drain electrodes 175a and 175b are opposite thereon.

In FIG. 23, the shapes of the drain electrodes 175a and 175b are slightly different in the left and right pixels. Firstly, referring to the left pixel, the first drain electrode 175a among two drain electrodes 175a and 175b runs parallel to the data lines 171l and 171r, is curved in the oblique direction, and finally forms a wide end portion on the storage electrode 137. The second drain electrode 175b extends parallel to the data lines 171l and 171r, is slightly curved close to the right data line 171r, again extends parallel to the data line 171l and 171r, intersects the storage electrode line 131, is bent twice at a right angel to rotate on the circumference of the end portion of the first drain electrode 175a, and finally forms a wide end portion on the storage electrode 137. Accordingly, the wide end portion of the first drain electrode 175a is closer to the right data line 171r than the wide end portion of the second drain electrode 175b. Next, in the right pixel, the first drain electrode 175a is once more curved before storage electrode 137, extends parallel to the data lines 171l and 171r, and forms a wide end portion on the storage electrode 137, and the second drain electrode 175b intersects the storage electrode line 131, is bent twice at a right angle, and forms a wide end portion on the storage electrode 137. Accordingly, the wide end portion of the first drain electrode 175a is disposed further away from the right data line 171r than the wide end portion of the second drain electrode 175b.

A passivation layer (not shown) is formed on the data lines 171l and 171r and the drain electrodes 175a and 175b, and a light blocking member 220 is formed on the passivation layer. Referring to FIG. 24, the light blocking member 220 includes a first portion 221 extending in the vertical direction on the data lines 171l and 171r, second portions 223a and 223b formed on the storage electrode lines 131, a third portion 223c connected between the second portions 223a and 223b, and fourth portions 227a and 227b covering the channels of the thin film transistors.

The first portion 221 covers the data lines 171l and 171r and extends according to the data lines 171l and 171r in the vertical direction to form a dam. The first portion 221 is wholly arranged with a stripe shape to define spaces for storing the color filters 230 in the vertical direction, and resultantly forms long storing spaces in the vertical direction. Here, the first portion 221 does not completely cover the data lines 171l and 171r but covers an area between two data lines 171l and 171r and the sides close to each other of the two data lines 171l and 171r. Also, the second portions 223a and 223b are formed parallel to the storage electrode 137 on/under the lower storage electrode 137 in a horizontal direction to connect between the first portions 221. The third portion 223c is disposed on the wide end portion of the first drain electrode 175a and the wide end portion of the second drain electrode 175b, and connects between the second portions 223a and 223b. The fourth portions 227a and 227b protrude from the first portion 221, and cover the thin film transistors to prevent the light from being incident on the channels of the thin film transistors Qa and Qb. Here, the height of the light blocking member 220 is in the range of 1.5-4 µm to prevent the ink for the color filter from overflowing, and the width of the light blocking member 220 may be various as necessary.

In this way, because the first portion 221 extends in the vertical direction to form the dam, the color filters (not shown) may be formed by dripping a liquid material (hereinafter, ink) for forming the color filter in the Inkjet process. Here, because the second portions 223a and 223b are disposed adjacent to the storage electrode 137, the color filter may be prevented from being formed on the storage electrode 137, and accordingly the color filter may be prevented from covering the portion where the contact holes 185a and 185b are formed.

An overcoat layer (not shown) is formed on the light blocking member 220 and the color filter, and two sub-pixel electrodes 191a and 191b are formed on the overcoat layer. The two sub-pixel electrodes 191a and 191b are respectively connected to the drain electrodes 175a and 175b through contact holes 185a and 185b that pass through the overcoat layer and the passivation layer. The first sub-pixel electrode 191a extends to the data lines 171l and 171r and the gate line 121 to increase the aperture ratio. Here, because the boundaries of the first sub-pixel electrodes 191a of the two neighboring pixels are disposed on the first portion 221 of the light blocking member 220, the etch uniformity may be ensured in the etching for forming them such that short-circuiting of two neighboring first sub-pixel electrodes 191a to each other may be prevented. Also, because the third portion 223c of the light blocking member 220 is disposed on the gap between two sub-pixel electrodes 191a and 191b, steps generated due to the second portions 223a and 223b may be prevented. Accordingly, the etch uniformity may be ensured, and a short-circuit between two sub-pixel electrodes 191a and 191b may be prevented.

In the third exemplary embodiment, the end portions of the drain electrodes 175a and 175b are disposed on the storage electrode 137, the contact holes 185a and 185b are disposed on the storage electrode 137, and the light blocking member 220 is disposed on/under the storage electrode 137 such that the color filter is prevented from being formed on the storage electrode 137. Accordingly, the storage capacitance may be sufficiently ensured and the contact holes 185a and 185b may be easily formed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A thin film transistor array panel comprising:
   a substrate;
   a gate line extending in a first direction on the substrate;
   a data line extending in a second direction on the substrate to intersect the gate line, the data line being insulated from the gate line;
   a thin film transistor including a control terminal connected to the gate line, an input terminal connected to the data line, and an output terminal;
   a color filter formed on the thin film transistor;
   a light blocking member formed on the thin film transistor, defining a space for storing the color filter, and including a first protection portion surrounding at least a region of the output terminal of the thin film transistor;
   a passivation layer formed over the thin film transistor and under the light blocking member and the color filter; and
   a pixel electrode formed on the light blocking member and the color filter, and contacting the region of the output terminal surrounded by the first protection portion of the light blocking member,
   wherein the pixel electrode is connected to the output terminal of the thin film transistor through a contact hole formed in the passivation layer disposed in a region enclosed by the first protection portion of the light blocking member.

2. The thin film transistor array panel of claim 1, wherein the height of the light blocking member is in the range of 1.5 μm-4 μm.

3. The thin film transistor array panel of claim 2, wherein the light blocking member includes a second protection portion extending along the data line, and the color filter has different colors in two regions divided by the second protection portion.

4. The thin film transistor array panel of claim 3, further comprising:
   a storage electrode line extending in the first direction and including a storage electrode,
   wherein the light blocking member includes a third protection portion surrounding at least a portion of the storage electrode along with the second protection portion to prevent the color filter from being formed on the storage electrode.

5. The thin film transistor array panel of claim 4, wherein the light blocking member includes a fourth protection portion covering the thin film transistor.

6. The thin film transistor array panel of claim 5, wherein at least a portion of the output terminal of the thin film transistor overlaps the storage electrode, and the first protection portion of the light blocking member encloses the portion of the output terminal overlapping the storage electrode.

7. The thin film transistor array panel of claim 6, wherein the thin film transistor includes a first thin film transistor and a second thin film transistor, the pixel electrode includes a first sub-pixel electrode connected to the output terminal of the first thin film transistor and a second sub-pixel electrode connected to the output terminal of the second thin film transistor, and the first protection portion of the light blocking member includes first and second portions disposed on both sides with respect to the storage electrode, and a third portion connecting the first portion and the second portion to each other and overlapping a gap between the first sub-pixel electrode and the second sub-pixel electrode.

8. The thin film transistor array panel of claim 1, wherein the light blocking member includes a second protection portion extending along the data line, and the color filter has different colors in two regions divided by the second protection region.

9. The thin film transistor array panel of claim 8, further comprising:
   a storage electrode line extending in the first direction and including a storage electrode,
   wherein the light blocking member includes a third protection portion surrounding at least a portion of the storage electrode along with a second protection portion to prevent the color filter from being formed on the storage electrode.

10. The thin film transistor array panel of claim 9, wherein the light blocking member includes a fourth protection portion covering the thin film transistor.

11. The thin film transistor array panel of claim 10, wherein at least a portion of the output terminal of the thin film transistor overlaps the storage electrode, and the first protection portion of the light blocking member encloses a portion of the output terminal overlapping the storage electrode, and has a function of the third protection portion.

12. The thin film transistor array panel of claim 10, wherein the thin film transistor includes a first thin film transistor and a second thin film transistor, the pixel electrode includes a first sub-pixel electrode connected to the output terminal of the first thin film transistor and a second sub-pixel electrode connected to the output terminal of the second thin film transistor, and the first protection portion of the light blocking member includes first and second portions disposed on both sides with respect to the storage electrode, and a third portion connecting the first portion and the second portion to each other and overlapping a gap between the first sub-pixel electrode and the second sub-pixel electrode.

13. The thin film transistor array panel of claim 1, further comprising:
   a storage electrode line extending in the first direction and including a storage electrode, wherein at least a portion of the output terminal of the thin film transistor overlaps the storage electrode, and the first protection portion of the light blocking member encloses a portion of the output terminal overlapping the storage electrode.

14. The thin film transistor array panel of claim 13, further comprising:
    an overcoat layer formed over the light blocking member and the color filter and under the pixel electrode,
    wherein the pixel electrode is connected to the output terminal of the thin film transistor through a contact hole formed in the passivation layer and the overcoat layer.

15. The thin film transistor array panel of claim 1, wherein the data line includes a first data line and a second data line,
    the thin film transistor includes a first thin film transistor having an input terminal connected to the first data line and a second thin film transistor having an input terminal connected to the second data line, and
    the pixel electrode includes a first sub-pixel electrode connected to an output terminal of the first thin film transistor and a second sub-pixel electrode connected to an output terminal of the second thin film transistor.

16. The thin film transistor array panel of claim 15, further comprising
    a storage electrode line extending in the first direction and including a storage electrode,
    wherein the first protection portion of the light blocking member includes a first portion surrounding the output terminal of the first thin film transistor, a second portion surrounding the output terminal of the second thin film transistor, and the first and second portions of the light blocking member overlap the storage electrode.

17. The thin film transistor array panel of claim 15, further comprising
    a storage electrode line extending in the first direction and including a storage electrode,
    wherein the first protection portion of the light blocking member includes a first portion surrounding the output terminal of the first thin film transistor, a second portion surrounding the output terminal of the second thin film transistor, and wherein the first and second portions of the light blocking member overlap the storage electrode.

18. A method for manufacturing a thin film transistor array panel comprising:
    forming a gate line extending in a first direction;
    forming a gate insulating layer on the gate line;
    forming a semiconductor layer on the gate insulating layer;
    forming a data line and a drain electrode extending in a second direction intersecting the first direction;
    forming a passivation layer on the data line and the drain electrode;
    forming a light blocking member including a first portion defining a storing space and extending in the second direction on the passivation layer and a second portion surrounding the circumference of the end portion of the drain electrode;
    forming a color filter in the storing space through an inkjet process;
    forming a contact hole exposing the end portion of the drain electrode enclosed by the second portion in the passivation layer; and
    forming a pixel electrode connected to the drain electrode through the contact hole of the passivation layer enclosed by the second portion.

19. The method of claim 18, further comprising
    forming an overcoat layer covering the color filter between the forming of the color filter and the forming of the contact hole,
    wherein the overcoat layer and the passivation layer are patterned together by photolithography in the forming of the contact hole.

20. The method of claim 19, wherein
    the forming of the light blocking member includes
    forming a photosensitive film by coating a photosensitive material including black color pigments,
    exposing the photosensitive film, and
    developing the photosensitive film.

* * * * *